(12) United States Patent
Kuwahara et al.

(10) Patent No.: US 7,627,411 B2
(45) Date of Patent: Dec. 1, 2009

(54) CONTROL APPARATUS FOR AUTOMATIC TRANSMISSION

(75) Inventors: Seiji Kuwahara, Toyota (JP); Masato Kaigawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 678 days.

(21) Appl. No.: 11/345,486

(22) Filed: Feb. 2, 2006

(65) Prior Publication Data

US 2006/0178796 A1 Aug. 10, 2006

(30) Foreign Application Priority Data

Feb. 9, 2005 (JP) ............................. 2005-033664

(51) Int. Cl.
*G06F 7/70* (2006.01)
*G06G 7/00* (2006.01)
*G06G 7/76* (2006.01)

(52) U.S. Cl. .......................... 701/55; 701/51; 701/53; 701/54; 701/56; 701/58; 701/60; 701/65

(58) Field of Classification Search ............... 701/1, 701/51–66
See application file for complete search history.

(56) References Cited

U.S. PATENT DOCUMENTS

| 4,338,666 | A | 7/1982 | Suzuki et al. | |
| 7,076,355 | B2 * | 7/2006 | Ota et al. | 701/51 |
| 2003/0014173 | A1 | 1/2003 | Loeffler et al. | |

FOREIGN PATENT DOCUMENTS

| EP | 1 342 939 A2 | 9/2003 |
| JP | 2002-161772 | 6/2002 |

* cited by examiner

*Primary Examiner*—Khoi Tran
*Assistant Examiner*—Bhavesh V Amin
(74) *Attorney, Agent, or Firm*—Oblon, Spivak, McClelland, Maier & Neustadt, L.L.P.

(57) ABSTRACT

A control apparatus for controlling a step-variable automatic transmission of a vehicle to effect a shifting action of the automatic transmission on the basis of a target throttle valve opening angle for realizing a target vehicle drive force, so as to prevent a shift hunting phenomenon of the automatic transmission. The control apparatus includes a shift permitting portion operable to permit a shifting action of the automatic transmission back to an original speed position prior to a previous shifting action to the present n-th speed position, under the control of a shift control portion on the basis of the target throttle valve opening angle in the present speed position and a vehicle speed, if the previous shifting action to the present n-th speed position has been determined by a shift determining portion on the basis of the vehicle speed V and the target throttle valve opening angle which is calculated by a target-throttle-valve-angle calculating portion to obtain an engine torque to realize a target vehicle drive force set by a target-drive-force-related-value setting portion in the present n-th speed position of the automatic transmission, whereby the shift permitting portion inhibits the shifting action back to the original speed position prior to the previous shifting action under the control of the shift control portion on the basis of the target throttle valve opening angle immediately after the previous shifting action, thereby preventing the shift hunting phenomenon.

10 Claims, 10 Drawing Sheets

PRIOR ART

CONTROL APPARATUS FOR AUTOMATIC TRANSMISSION

The present application is based on Japanese Patent Application No. 2005-033664 filed Feb. 9, 2005, the contents of which are incorporated herein by reference

BACKGROUND OF THE INVENTION

1. Field of the Invention

The present invention relates to a control apparatus arranged to set a target-drive-force-related value corresponding to a target drive force of a vehicle which has a step-variable automatic transmission operatively connected to an engine, and more particularly to a control apparatus operable to control shifting actions of the step-variable automatic transmission.

2. Description of the Related Art

There is known a vehicle wherein an output of an engine is controlled so as to produce a target vehicle drive force which is set on the basis of an operating amount of an accelerator pedal and a running speed of the vehicle, while shifting actions of an automatic transmission are controlled on the basis of an actual value of the accelerator pedal operating amount and/or an actual value of the vehicle speed and according to stored shift-up and shift-down boundary lines (represented by a shift-boundary data map or relationship). JP-2002-161772A discloses an example of such a vehicle. Where the shifting actions of the automatic transmission are controlled on the basis of the accelerator pedal operating amount and the vehicle speed, as in the vehicle of JP-2002-161772A, there is a risk of some drawbacks as described below. For instance, a vehicle has a function of automatically controlling its running state irrespective of the accelerator pedal operating amount, such as a so-called automatic cruising control function of automatically controlling the vehicle running speed, and a so-called VSC (vehicle stability control) function of automatically stabilizing an attitude of the vehicle during turning or cornering of the vehicle. In this instance, there is a possibility that a shifting action of the automatic transmission does not match the vehicle drive force, since it is necessary to set the above-indicated target vehicle drive force irrespective of the accelerator pedal operating amount.

In view of the drawback described above, it is considered to calculate an opening angle of a throttle valve rather than the accelerator pedal operating amount, on the basis of the target vehicle drive force, and control the shifting of the automatic transmission on the basis of the calculated throttle valve opening angle and according to a shift-boundary data map using the throttle valve opening angle. The throttle valve opening angle is a more direct target value representative of the engine output for producing the target vehicle drive force, than the accelerator pedal operating amount.

However, the shift-boundary data map using the throttle valve opening angle suffers from a region in which the target vehicle drive force cannot be produced or realized, due to a torque characteristic of the engine or speed ratios of individual speed positions of the automatic transmission. Therefore, the throttle valve opening angle calculated on the basis of the target vehicle drive force gives rise to a risk of a shift hunting phenomenon depending upon a specific set value of the target vehicle drive force.

Described in greater detail by reference to FIG. 13, a vehicle drive force line F1 at a given vehicle speed V1 in a fist-speed position of the automatic transmission and a vehicle drive force line F2 at the vehicle speed V1 in a second-speed position of the automatic transmission are represented in a two-dimensional coordinate system defined by an axis of the throttle valve opening angle and an axis of the vehicle drive force. A shift-up point U in the coordinate system corresponds a throttle valve opening angle $\theta_U$ at the vehicle speed V1 on a 1-2 shift-up boundary line for a shift-up action of the automatic transmission from the first-speed position to the second-speed position, which 1-2 shift-up boundary line is represented by the shift-boundary data map. When the throttle valve opening angle θ becomes smaller than the throttle valve opening angle $\theta_U$, a determination to shift up the automatic transmission is made. On the other hand, a shift-down point D in the coordinate system corresponds a throttle valve opening angle $\theta_D$ at the vehicle speed V1 on a 2-1 shift-down boundary line for a shift-down action of the automatic transmission from the second-speed position to the first-speed position, which 2-1 shift-down boundary line is represented by the shift-boundary data map. When the throttle valve opening angle θ becomes larger than the throttle valve opening angle $\theta_D$, a determination to shift down the automatic transmission is made. The automatic transmission is shifted up to the second-speed position when the throttle valve opening angle θ decreases along the vehicle drive force line F1 and becomes smaller than the shift-up point U, and is shifted down to the first-speed position when the throttle valve opening angle θ increases along the vehicle drive force line F1 and becomes larger than the shift-down point D. Accordingly, there exists a region N indicated by hatching lines, in which no vehicle drive force cannot be produced.

Where a target vehicle drive force A is set within the region N indicated above, a throttle valve opening angle $\theta_A$ calculated on the basis of the target vehicle drive force A in the first-speed position of the automatic transmission is smaller than the shift-up point U, the automatic transmission is shifted up to the second-speed position. On the other hand, and a throttle valve opening angle $\theta_D$ calculated on the basis of the target vehicle drive force A in the second-speed position of the automatic transmission exceeds 100%, that is, is larger than the shift-down point D, the automatic transmission is shifted down to the first-speed position. Where the target vehicle drive force A is set within the region N, therefore, the shift hunting phenomenon takes place.

SUMMARY OF THE INVENTION

The present invention wad made in view of the background art described above. It is therefore an object of this invention to provide a control apparatus for controlling a step-variable automatic transmission of a vehicle having an engine operatively connected to the automatic transmission, which control apparatus prevents an occurrence of a shift hunting phenomenon of the automatic transmission when the automatic transmission is shifted on the basis of a target throttle valve opening angle used as a target-drive-force-related value of the vehicle.

The object indicated above may be achieved according to the principle of this invention, which provides a control apparatus for a step-variable automatic transmission of a vehicle having an engine operatively connected to the step-variable automatic transmission, the control apparatus being characterized by comprising (a) a target-drive-force-related-value setting portion operable to set a target-drive-force-related value corresponding to a target drive force of the vehicle, (b) a target-throttle-valve-angle calculating portion operable to calculate a target opening angle of a throttle valve of the engine for obtaining an output of the engine to realize the target-drive-force-related value in a present speed position of the step-variable automatic transmission, (c) a shift control portion operable to determine a shifting action of the step-variable automatic transmission on the basis of the target opening angle of the throttle valve and a vehicle-speed-related value and according to stored shift boundary lines which are predetermined so as to provide a predetermined amount of hysteresis between a determination of a shift-up action between two speed positions of the automatic transmission and a determination of a shift-down action between those two speed positions, and to effect the shifting action, (d) a shift determining portion operable to determine as to whether to effect a shifting action of the step-variable automatic transmission to the present speed position, on the basis of the target opening angle of the throttle valve in the present speed position and the vehicle-speed-related value, and according to the shift boundary lines; and (e) a shift permitting portion operable to permit a shifting action of the step-variable automatic transmission back to an original speed position prior to a previous shifting action to the present speed position, under the control of the shift control portion on the basis of the target opening angle of the throttle valve in the present speed position and the vehicle-speed-related value, if the previous shifting action to the present speed position has been determined by the shift determining portion.

In the above-described control apparatus for the step-variable automatic transmission operatively connected to the engine of the vehicle, the shift permitting portion is arranged to permit the shifting action of the step-variable automatic transmission back to the original speed position prior to the previous shifting action to the present speed position, under the control of the shift control portion on the basis of the target throttle valve opening angle and the vehicle-speed-related value, if the previous shifting action to the present speed position has been determined by the shift determining portion on the basis of the vehicle-speed-related value and the target throttle valve opening angle which is calculated by the target-throttle-valve-angle calculating portion, so as to obtain the engine output in the present speed position for realizing the target-drive-force-related value corresponding to the target vehicle drive force. This arrangement prevents the shifting action of the step-variable automatic transmission under the control of the shift control portion on the basis of the target throttle valve opening angle, back to the original speed position prior to the previous shifting action to the present speed position, immediately after the previous shifting action, thereby preventing the shift hunting phenomenon of the step-variable automatic transmission. In other words, the shift permitting portion inhibits the shifting action back to the original speed position prior to the previous shifting action on the basis of the throttle valve opening angle unless the shift-up action between the two speed positions and the shift-down action between the same two speed positions are determined on the basis of the same target throttle valve opening angle, so that the shifting actions of the step-variable automatic transmission are controlled so as to maintain the predetermined amount of hysteresis between the determination of the shift-up action between those two speed positions and the shift-down action between the same two speed positions, thereby preventing the shift hunting phenomenon of the step-variable automatic transmission.

According to a first preferred form of this invention, the shift determining portion determines whether the shift-down action to the present speed position should be effected, on the basis of the target opening angle of the throttle valve in the present speed position and the vehicle-speed-related value, and according to the shift boundary lines, and the shift permitting portion permits the shift-up action of the step-variable automatic transmission back to the original speed position prior to the previous shift-down action under the control of the shift control portion on the basis of the target opening angle in the present speed position and the vehicle-related value, if the previous shift-down action to the present speed position has been determined by the shift determining portion. In this form of the invention, the shift permitting portion inhibits the shift-up action under the control of the shift control portion on the basis of the throttle valve opening angle in the present speed position, immediately after the shift-down action to the present speed position, thereby preventing the shift hunting phenomenon. In other words, the shift permitting portion inhibits the shift-up action on the basis of the throttle valve opening angle in the present speed position unless the shift-down action between the two speed positions and the shift-up action between the same two speed positions are determined on the basis of the target throttle valve opening angle in the present speed position, so that the shift-up action of the step-variable automatic transmission is controlled so as to maintain the predetermined amount of hysteresis between the determination of the shift-down action between those two speed positions and the determination of the shift-up action between the same two speed positions, thereby preventing the shift hunting phenomenon of the step-variable automatic transmission.

According to a second preferred form of this invention, the shift determining portion determines whether the shift-up action to the present speed position should be effected, on the basis of the target opening angle of the throttle valve in the present speed position and the vehicle-speed-related value, and according to the shift boundary lines, and the shift permitting portion permits the shift-down action of the step-variable automatic transmission to the original speed position prior to the previous shift-up action under the control of the shift control portion on the basis of the target opening angle in the present speed position and the vehicle-related value, if the previous shift-up action to the present speed position has been determined by the shift determining portion. In this form of the invention, the shift permitting portion inhibits the shift-down action under the control of the shift control portion on the basis of the throttle valve opening angle in the present speed position, immediately after the shift-up action to the present speed position, thereby preventing the shift hunting phenomenon. In other words, the shift permitting portion inhibits the shift-down action on the basis of the throttle valve opening angle in the present speed position unless the shift-up action between the two speed positions and the shift-down action between the same two speed positions are determined on the basis of the target throttle valve opening angle in the present speed position, so that the shift-down action of the step-variable automatic transmission is controlled so as to maintain the predetermined amount of hysteresis between the determination of the shift-up action between those two speed positions and the determination of the shift-down action between the same two speed positions, thereby preventing the shift hunting phenomenon of the step-variable automatic transmission.

According to a third preferred form of this invention, the control apparatus further comprises a second target-throttle-valve-angel calculating portion operable to calculate a second target opening angle of the throttle valve for obtaining an output of the engine to realize the target-drive-force-related value in the original speed position prior to the previous shifting action of the step-variable automatic transmission, and the shift control portion controls the shifting action of the step-variable automatic transmission back to the original speed position prior to the previous shifting action, on the basis of the second target opening angle in the original speed position and the vehicle-speed-related value, and according to the shift boundary lines, until the shift permitting portion permits the shifting action of the step-variable automatic transmission back to the original speed position on the basis of the target opening angle in the present speed position and the vehicle-speed-related value. In this preferred form of the invention, the shift control portion prevents complete inhibition of the shifting action back to the original speed position prior to the previous shifting action while the shifting action back to the original speed position on the basis of the throttle valve opening angle in the present speed position is not permitted by the shift permitting portion. In other words, the shift control portion prevents an excessive degree of inhibition of the shifting action back to the original speed position due to the prevention of the shift hunting phenomenon by the shift permitting portion.

In a first advantageous arrangement of the third preferred form of the invention, the second target-throttle-valve-angle calculating portion calculate the second target opening angle of the throttle valve in the original speed position prior to the shift-down action of the step-variable automatic transmission, and the shift control portion controls the shift-up action of the step-variable automatic transmission back to the original speed prior to the shift-down action on the basis of the second target opening angle in the original speed position prior to the shift-down action and the vehicle-speed-related value and according to the shift boundary lines, until the shift permitting portion permits the shift-up action of the step-variable automatic transmission on the basis of the target opening angle in the present speed position and the vehicle-speed-related value. In this advantageous arrangement, the shift control portion prevents complete inhibition of the shift-up action back to the original speed position while the shift permitting portion inhibits the shift-up action on the basis of the target throttle valve opening angle in the present speed position.

In a second advantageous arrangement of the third preferred form of the invention, the second target opening angle of the throttle valve in the original speed position prior to the shift-up action of the step-variable automatic transmission, and the shift control portion controls the shift-down action of the step-variable automatic transmission back to the original speed prior to the shift-up action on the basis of the second target opening angle in the original speed position prior to the shift-up action and the vehicle-speed-related value and according to the shift-boundary lines, until the shift permitting portion permits the shift-down action of the step-variable automatic transmission on the basis of the target opening angle in the present speed position and the vehicle-speed-related value. In this advantageous arrangement, the shift control portion prevents complete inhibition of the shift-down action back to the original speed position while the shift permitting portion inhibits the shift-down action on the basis of the target throttle valve opening angle in the present speed position.

According to a fourth preferred form of this invention, the target-drive-force-related-value setting portion sets the target-drive-force-related value on the basis of an operating amount of an output control member manually operated by an operator of the vehicle. In this form of the invention, the drive-force-related value required by the vehicle operator can be adequately obtained.

In one advantageous arrangement of the fourth preferred form of the invention, the target-drive-force-related-value setting portion sets the target-drive-force-related value, irrespective of the operating amount of said output control member, for automatically controlling a state of the vehicle. In this arrangement, the target-drive-force-related value for automatically controlling the vehicle state can be adequately obtained, irrespective of the operating amount of the output control member.

According to a fifth preferred form of this invention, the target-throttle-valve-angle calculating portion calculates a target torque $T_E^*$ of the engine in the present speed position according to the following equation (1), and calculates the target opening angle $\theta_{TH}^*$ for obtaining the target torque, on the basis of a speed of the engine and according to a stored predetermined engine torque characteristic which is a relationship among the speed and torque of the engine, and the opening angle of the throttle valve used as a parameter, $$T_E^* = (F^* \times r_w)/(\gamma \times i) \tag{1}$$

wherein
F*=the target drive force of the vehicle,
γ=a speed ratio of the present speed position of the step-variable automatic transmission,
i=a speed reduction ratio of drive wheels of the vehicle with respect to the engine, which ratio is calculated without taking account of the speed ratio γ,
$r_w$=an effective radius of the drive wheels,
$T_E^*$=the target torque for realizing the target drive force F*, and
$\theta_{TH}^*$=the target opening angle in said present speed position.

In this arrangement, the target drive force of the vehicle as set by the target-drive-force-related-value setting portion can be adequately obtained.

According to a sixth preferred form of this invention, the shift permitting portion permits the shifting action of the step-variable automatic transmission to the original speed position prior to the previous shifting action, under the control of the shift control portion on the basis the target opening angle of the throttle valve in the present speed position and the vehicle-speed-related value, if the previous shifting action to the present speed position on the basis of the target opening angle of the throttle valve in the present speed position and the vehicle-speed-related value and according to the shift boundary lines has been determined by the shift determining portion, where there exists a region in which the target-drive-force-related value cannot be realized when the step-variable automatic transmission is shifted under the control of the shift control portion on the basis of the target opening angle in the present speed position and the vehicle-speed-related value and according to the shift boundary lines. In this form of the invention, the shift hunting phenomenon of the automatic transmission depending upon the set target-drive-force-related value can be prevented where there exists the region in which the target-drive-force-related value cannot be realized.

The operating amount of the output control member operated by the vehicle operator is preferably a parameter indicative of the drive-force-related value of the vehicle as required by the vehicle operator (operator's required vehicle output amount). For example, the operating amount of the output control member is an operating amount of an accelerator pedal.

The engine, which is a drive power source for driving the vehicle, is preferably an internal combustion engine such as a gasoline or diesel engine. An auxiliary vehicle drive power source such as an electric motor may be used in addition to the engine. Where the electric motor is uses as a vehicle drive power source, the target opening angle of the throttle valve and a target drive current (supplied from a battery device, for example) for driving the electric motor are calculated such that the target vehicle drive force is provided by the output of the engine and the output of the electric motor.

The step-variable automatic transmission is preferably a planetary gear type transmission which includes a plurality of planetary gear sets and which has a plurality of speed positions, for example, four, five, six, seven or eight forward-drive speed positions, one of which is selectively established by selectively interconnecting rotary elements of the planetary gear sets through frictional coupling devices. Alternatively, the step-variable automatic transmission is a synchronous coupling parallel two-axes type automatic transmission including a plurality of pairs of mutually meshing shifting gears which are mounted on respective two axes and one of which is selectively placed in a power transmitting state by a synchronizing device driven by a hydraulic actuator, for effecting automatic shifting of the automatic transmission.

The frictional coupling devices used for the planetary gear type transmission are preferably hydraulically operated frictional coupling devices such as multiple-disc or single-disc clutches and brakes, or belt-type brakes, which are engaged by respective hydraulic actuators. These frictional coupling devices may be operated by a pressurized working fluid delivered from an oil pump which is driven, for example, by the vehicle drive power source or an exclusive electric motor provided in addition to the vehicle drive power source. The clutches and brakes need not be hydraulically operated devices, but may be electromagnetic clutches, magnetic-powder clutches and other electromagnetic coupling devices.

The step-variable automatic transmission may be of a transversely mounted type mounted with its axis parallel to the transversal or width direction of the vehicle as in an FF (front-engine front-drive) vehicle, or of a longitudinally mounted type mounted with its axis parallel to the longitudinal direction of the vehicle as in a FR (front-engine rear-drive) vehicle.

The engine and the step-variable automatic transmission are operatively connected to each other through a damper, a direct coupling clutch, a direct coupling clutch equipped with a damper, or a fluid-actuator power transmitting device, which is disposed between the crankshaft of the engine and the input shaft of the automatic transmission. The fluid-actuator power transmitting device may be a torque converter or a fluid coupling.

BRIEF DESCRIPTION OF THE DRAWINGS

The above and other objects, features, advantages and industrial significance of this invention will be better understood by reading the following detailed description of a preferred embodiment of the invention, when considered in connection with the accompanying drawings, in which.

DETAILED DESCRIPTION OF THE PREFERRED EMBODIMENT

Referring to the accompanying drawings, a preferred embodiment of this invention will be described in detail.

Figure 1:
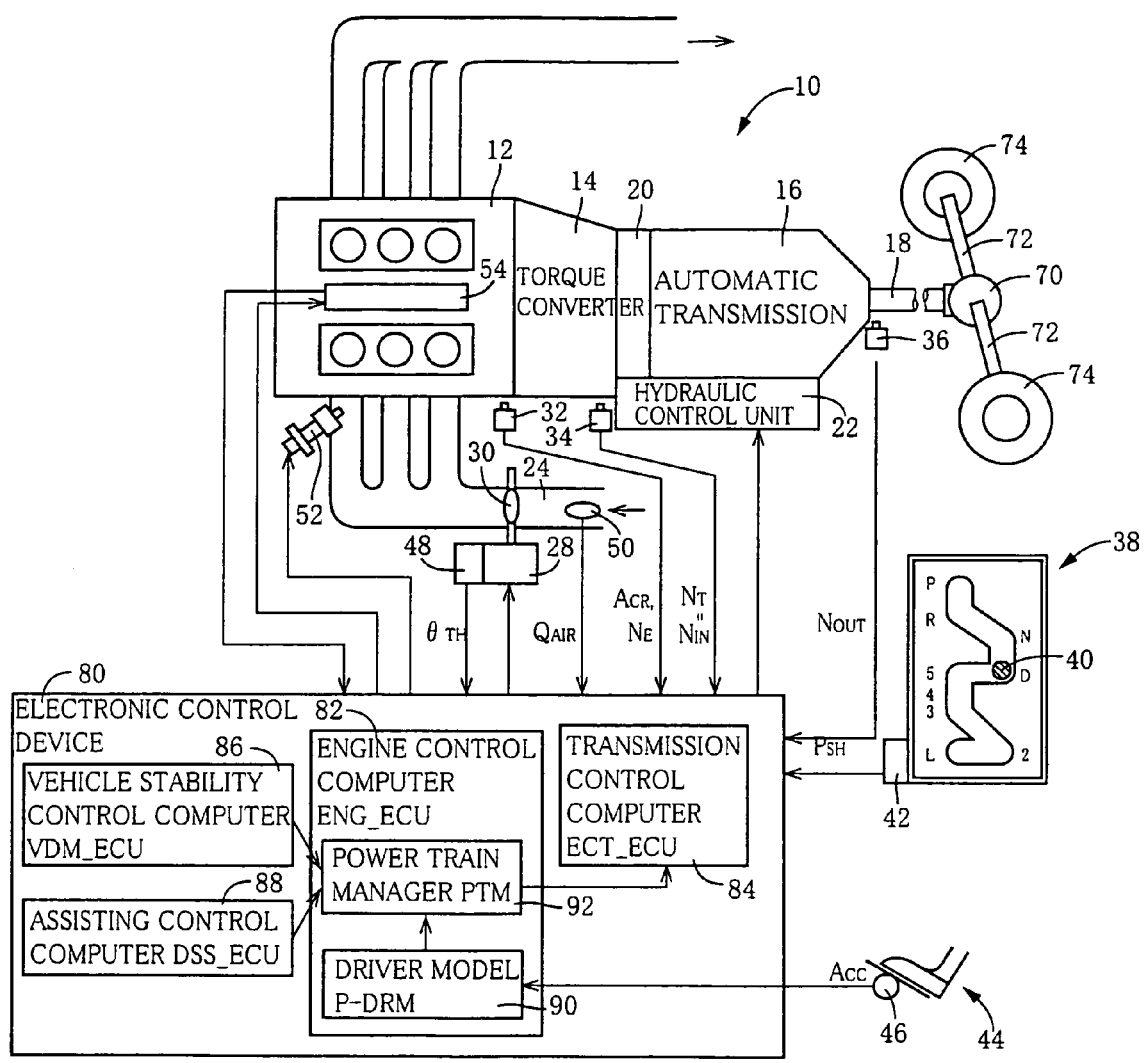
FIG. 1 is a view schematically showing a power transmitting system of a vehicle to which the present invention is applicable, in combination with a block diagram showing a control device provided on the vehicle to control the power transmitting system and other devices.

FIG. 1 is a view schematically showing a power transmitting system 10 of a vehicle to which the present invention is applicable, in combination with a block diagram showing a control device provided on the vehicle to control the power transmitting system 10 and other devices. The power transmitting system 10 includes a torque converter 14 and an automatic transmission 16 which are coaxially disposed in a stationary member in the form of a transmission casing attached to a body of the vehicle. The automatic transmission 16 is operatively connected through the torque converter 14 to a crankshaft of an engine 12 provided as a vehicle drive power source. A drive force produced by the engine 12 is input to the automatic transmission 16 through the torque converter 14, and is transmitted from an output shaft 18 of the automatic transmission to right and left drive wheels 74 through a differential gear device (final speed reducing device) 70 and a pair of drive shafts in the form of axles 72.

The automatic transmission 16 is a step-variable automatic transmission which is placed in or shifted to a selected one of a plurality of speed positions (gear positions) and which is arranged such that the speed of its output rotary motion is reduced or increased at a selected speed ratio γ with respect to the speed of its input rotary motion. For example, the automatic transmission 16 is a planetary gear type automatic transmission having a plurality of speed positions which are established by respective combinations of operating states of hydraulically operated frictional coupling devices such as clutches and brakes, which are engaged by hydraulic actuators. For example, the automatic transmission 16 is placed in a selected one of six forward-drive positions, one rear-drive position and a neutral position. Each of the hydraulically operated frictional coupling devices of the automatic transmission 16 is controlled by a hydraulic control unit 22 arranged to receive a line pressure, which is generated on the basis of a hydraulic pressure which is generated by a mechanical oil pump 20 mechanically connected to and driven directly by the engine 12 and which is regulated as needed. The line pressure is a highest engaging pressure used for an engaging action of each hydraulically operated frictional coupling device of the automatic transmission 16.

An electronic control device 80 includes a so-called microcomputer incorporating a CPU, a RAM, a ROM and an input-output interface. The CPU operates to perform signal processing operations according to control programs stored in the ROM while utilizing a temporary data storage function of the RAM. For instance, the electronic control device 80 is arranged to effect an output control of the engine 12 and a shift control operation of the automatic transmission 16, and is constituted by an engine control computer 82 (hereinafter referred to as "ENG_ECU 82"), a transmission control computer 84 (hereinafter referred to as "ECT_ECU 84"), a vehicle stability control computer 86 (hereinafter referred to as "WDM_ECU 86"), and an assisting control computer 88 (hereinafter referred to as "DSS_ECU 88").

The electronic control device 80 is arranged to receive output signals of sensors and switches provided on the vehicle, such as: an output signal of a crank position sensor 32 indicative of a crankshaft angle or position $A_{CR}$(°) and a crankshaft speed corresponding to a speed $N_E$ of the engine 12; an output signal of a turbine speed sensor 34 indicative of a turbine speed $N_T$ of the torque converter 14, that is, an input speed $N_{IN}$ of the automatic transmission 16; an output signal of an output shaft speed sensor 36 indicative of a speed $N_{OUT}$ of the output shaft 18 which is a vehicle-speed-related value; an output signal of a shift-lever position sensor 42 indicative of a selected position $P_{SH}$ of a shift lever 40; an output signal of an accelerator sensor 46 indicative of an operating amount $A_{CC}$ of an accelerator pedal 44; a throttle position sensor 48 indicative of an opening angle $\theta_{TH}$ of an electronic throttle valve 30 provided in an intake pipe 24; and an intake air quantity sensor 48 indicative of an intake air quantity $Q_{AIR}$. The vehicle-speed-related value is a value relating (equivalent) to a vehicle speed V that is a running speed of the vehicle. The vehicle-speed related value may be the vehicle speed V per se, or alternatively the above-indicated output shaft speed $N_{OUT}$, rotating speeds of the axles 72, a rotating speed of a propeller shaft, or a rotating speed of an output shaft of the differential gear device 70. In the present embodiment, the term "vehicle speed" may be interpreted also as the vehicle-speed-related value, unless otherwise specified.

The electronic control device 80 is arranged to generate: control signals for controlling the engine output, such as a drive signal to be applied to a throttle actuator 28 operable to control the opening angle $\theta_{TH}$ of the electronic throttle valve 30, a fuel injection signal for controlling an amount of fuel $F_{EFI}$ to be injected by a fuel injecting valve 52, and an ignition signal for controlling a timing of ignition of the engine 12 by an igniter 54; and valve control signals for energizing and de-energizing solenoid-operated valves provided in the hydraulic control unit 22 for shifting the automatic transmission 16.

The accelerator pedal 44 is a manually operable output control member which is operated by an amount according to an amount of vehicle output required by an operator of the vehicle, and the operating amount $A_{CC}$ of the accelerator pedal 44 corresponds to a required amount of an output of the vehicle.

The hydraulic control unit 22 incorporates not only the solenoid-operated valves for shifting the automatic transmission, but also other valves such as a linear solenoid valve SLT for regulating the line pressure. A working fluid used by the hydraulic control unit 22 is also used for lubricating various portions of the automatic transmission 16. The hydraulic control unit 22 is provided with a manual valve connected to the shift lever 40 through a cable or link, so that the manual valve is mechanically operated according to an operation of the shift lever 40, to switch hydraulic circuits in the hydraulic control unit 22.

The shift lever 40 is a part of a shifting device 38 which functions as a shift-position selecting device and which is disposed at a center console located on one side of an operator's seat. The shifting device 38 is operated by operating the shift lever 40 to a selected one $P_{SH}$ of its operating positions consisting of: a parking position P for establishing a neutral state of the automatic transmission 16 for disconnection of its power transmitting path and locking the output shaft 18 of the automatic transmission 16; a reverse-drive position R for reverse driving of the vehicle; a neutral position N for establishing the neutral state of the automatic transmission 16 for disconnection of its power transmitting path; a forward-drive position D (highest-speed position) in which the automatic transmission 16 is automatically shiftable to a selected one of a first-speed position through a sixth-speed position in an automatic shifting mode; a fifth engine-braking position 5 in which the automatic transmission 16 is automatically shiftable to a selected one of the first-speed position through a fifth-speed position and in which an engine brake is applicable to the vehicle in the selected position; a fourth engine-braking position 4 in which the automatic transmission 16 is shiftable to a selected one of the first-speed position through a fourth-speed position and in which the engine brake is applicable to the vehicle in the selected position; a third engine-braking position 3 in which the automatic transmission 16 is shiftable to a selected one of the first-speed position through a third-speed position; a second engine-braking position 2 in which the automatic transmission 16 is shiftable to one of the first-speed position and a second-speed position and in which the engine brake is applicable to the vehicle in the selected position; and a first engine-braking position in which the automatic transmission 16 is placed in the first-speed position and in which the engine brake is applicable to the vehicle.

The ENG_ECU 82 is arranged to determine a target value of a drive-force-related value (hereinafter referred to as "target-drive-force-related value") relating to a vehicle drive force, on the basis of a signal indicative of the accelerator pedal operating amount $A_{CC}$, or on the basis of a required vehicle output amount represented by a signal received from the VDM_ECU 86 or DSS_ECU 88, and to control the output of the engine 12 so as to realize the determined target-drive-force-related value.

The ECT_ECU 84 is arranged to determine a shifting action of the automatic transmission 16 on the basis of the running state of the vehicle, for example, the vehicle speed V and a control amount used by the ENG_ECU 82 for controlling the output of the engine 12, such as the throttle valve opening amount $\theta_{TH}$, and control the automatic transmission 16 to effect the determined shifting action.

Thus, the present embodiment is arranged to effect a so-called "required-drive-force control" to control a vehicle drive force F, by determining the target-drive-force-related value of the vehicle and controlling the output of the engine 12 and/or the shifting action of the automatic transmission 16, so as to realize the determined target-drive-force-related value.

The "drive-force-related value" described above is a value relating (equivalent) to a vehicle drive force (hereinafter referred to as "drive force") F acting on surfaces of the drive wheels 74 in contact with the ground surface, and may be not only the vehicle drive force F, but also any one of the following values, for examples: an acceleration value G[G, m/s$^2$]; a torque $T_D$[Nm] of the axles 72 as a drive shaft torque; an output P[PS, kW, HP] (hereinafter referred to as "output" or "power") of the vehicle; a torque $T_E$[Nm] of the crankshaft as the output torque of the engine 12; a torque $T_T$[Nm] (hereinafter referred to as "turbine torque") of the turbine shaft of the torque converter 14 as the output torque of the torque converter 14, namely, a torque $T_{IN}$[Mm] (hereinafter referred to as "input shaft torque") of the input shaft of the automatic transmission 16 as the input torque of the automatic transmission 16; a torque $T_{OUT}$[Nm] (hereinafter referred to as "output shaft torque") of the output shaft 18 of the automatic transmission 16 as the output torque of the automatic transmission 16; and a torque $T_P$[Nm] of the propeller shaft. In the present embodiment, the term "drive force" may be interpreted also as the drive-force-related value, unless otherwise specified.

The VDM_ECU 86 and the DSS_ECU 88 are arranged to determine a required vehicle drive force $F_{DIM}$ as a required amount of vehicle output for controlling the running state of the vehicle, irrespective of the accelerator pedal operating amount $A_{CC}$.

For example, the VDM_ECU 86 is provided with a so-called "VSC system" functioning to effect a vehicle stability control for stabilizing the attitude of the vehicle during turning or cornering of the vehicle, irrespective of the accelerator pedal operating amount $A_{CC}$. This VSC system is arranged to generate a required vehicle drive force $F_{DIMV}$ for restricting the vehicle drive force F while controlling a braking force to be applied to the drive wheels, to generate a moment to reduce a lateral slipping of the rear wheels or a moment to reduce a lateral slipping of the front wheels for thereby stabilizing the attitude of the vehicle attitude, on the basis of a degree of the lateral slipping of the rear wheels, namely, a degree of so-called "oversteering tendency" of the vehicle, or a degree of the lateral slipping of the front wheels, namely, a degree of so-called "understeering tendency" of the vehicle, during turning or cornering of the vehicle.

For instance, the DSS_ECU 88 is provided with an automatic vehicle-speed control system so-called "cruising control system" functioning to effect an assisting control for automatically controlling the vehicle speed V irrespective of the accelerator pedal operating amount $A_{CC}$. This cruising control system is arranged to generate a required vehicle drive force $F_{DIMS}$ for controlling the vehicle drive force F, for example, while controlling the braking force to the applied to the drive wheels, so as to maintain a target vehicle speed V* set by the vehicle operator.

Figure 2:
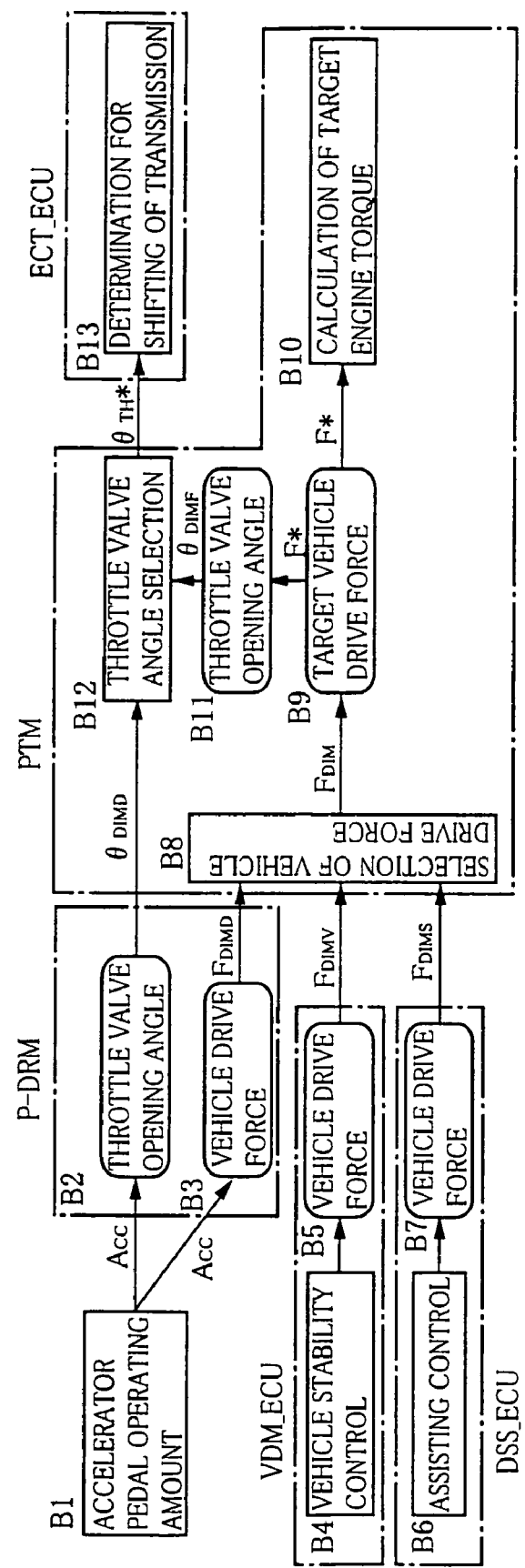
FIG. 2 is a block diagram schematically illustrating a flow of control operations performed by an electronic control device shown in FIG. 1, such as setting of a target vehicle drive force, calculation of a target opening angle of a throttle valve for controlling an output of an engine, and determination of shift-up actions of an automatic transmission.

Referring to the block diagram of FIG. 2, there is schematically illustrated a flow of control operations performed by the electronic control device 80, such as setting of the target vehicle drive force F*, calculation of the target throttle valve opening angle $\theta_{TH}$* for controlling the output of the engine 12, and determination of a shifting action of the automatic transmission 16.

As shown in FIG. 2, an operator's required throttle valve opening angle $\theta_{DIMD}$ is calculated (Block B2) on the basis of the accelerator pedal opening pedal operating amount $A_{CC}$ (Block B1) and according to a predetermined relationship (data map), so that the throttle valve opening amount $\theta_{TH}$ increases with an increase of the accelerator pedal operating amount $A_{CC}$. Similarly, an operator's required vehicle drive force $F_{DIMD}$ is calculated (Block B3) on the basis of the accelerator pedal operating amount $A_{CC}$ (Block B1). The operator's required throttle valve opening angle $\theta_{DIMD}$ and the operator's required vehicle drive force $F_{DIMD}$ are calculated by a driver model 90 (hereinafter referred to as "P-DRM 90") incorporated in the ENG_ECU 82.

The required vehicle drive force $F_{DIMV}$ for the vehicle stability control (Block B4) is generated by the VDM_ECU 86 (Block B5). Further, the required vehicle drive force $F_{DIMS}$ for the assisting control (Block B6) is generated by the DSS_ECU 88 (Block B7).

One of the operator's required vehicle drive force $F_{DIMD}$, the required vehicle drive force $F_{DIMV}$ and the required vehicle drive force $F_{DIMS}$ is selected according to a predetermined vehicle drive force selecting procedure (Block B8). The selected drive force $F_{DIM}$ is determined as the target vehicle drive force F* (Block B9). A target engine torque $T_E$* for realizing this target vehicle drive force F* is calculated (Block B10), and a required throttle valve opening angle $\theta_{DIMF}$ for obtaining this target engine torque $T_E$* is calculated (Block B11). Further, one of the operator's required throttle valve opening angle $\theta_{DIMD}$ and the required throttle valve opening angle $\theta_{DIMF}$ is selected according to a predetermined throttle valve opening angle selecting procedure, and the selected required throttle valve opening angle $\theta_{DIM}$ is determined as a target throttle valve opening angle $\theta_{TH}$* (Block B12). Normally, the required throttle valve opening angle $\theta_{DIMF}$ is determined as the target throttle valve opening angle $T_H$*. When the vehicle drive force F is not required, as in a racing of the engine 12, for instance, the operator's required throttle valve opening angle $\theta_{DIMD}$ is determined as the target throttle valve opening angle $\theta_{TH}$*. In the present embodiment wherein the vehicle drive force F is always required, the operator's required throttle valve opening angle $\theta_{DIMD}$ and the required throttle valve opening angle $\theta_{DIMF}$ are not distinguished from each other and are both referred to as the target throttle valve opening angle $\theta_{TH}$*. The target vehicle drive force F* and the target throttle valve opening angle TH* are calculated by a power train manager 92 (hereinafter referred to as "PTM 92") incorporated in the ENG_ECU 82.

The ECT_ECU 84 determines a shifting action of the automatic transmission 16 on the basis of the vehicle speed V and the target throttle valve opening angle $\theta_{TH}$* (Block B13).

Figure 3:
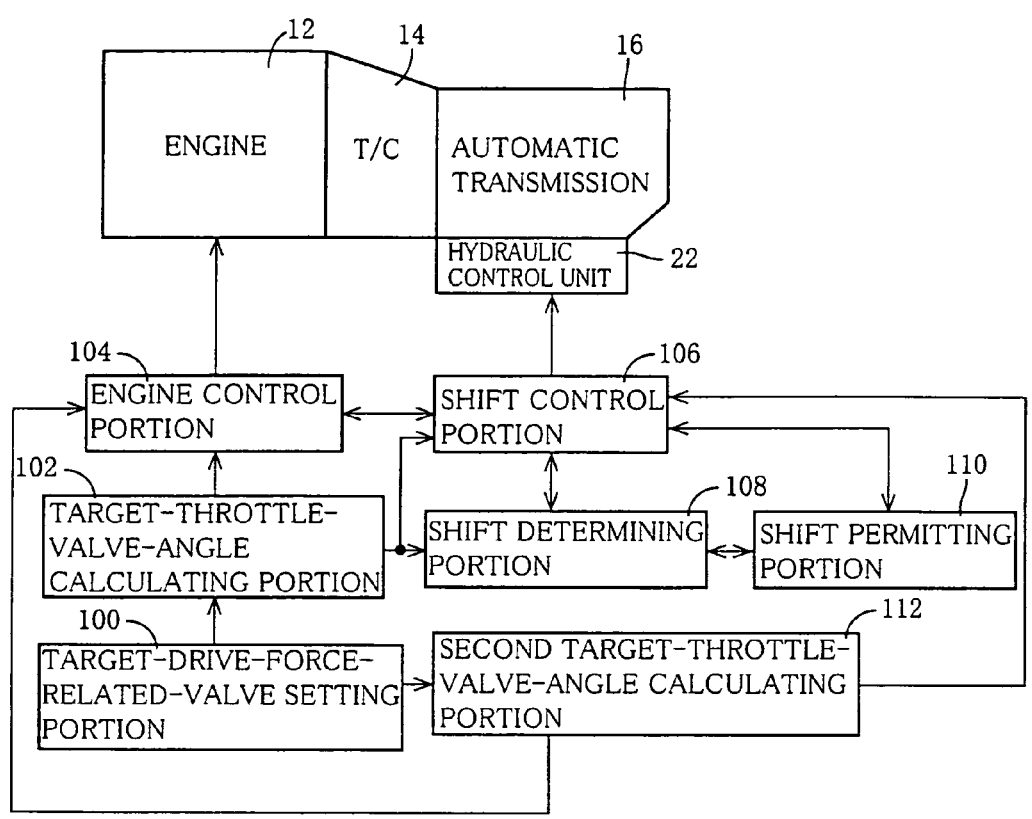
FIG. 3 is a functional block diagram illustrating major control functions of the electronic control device shown in FIG. 1.
Figure 4:
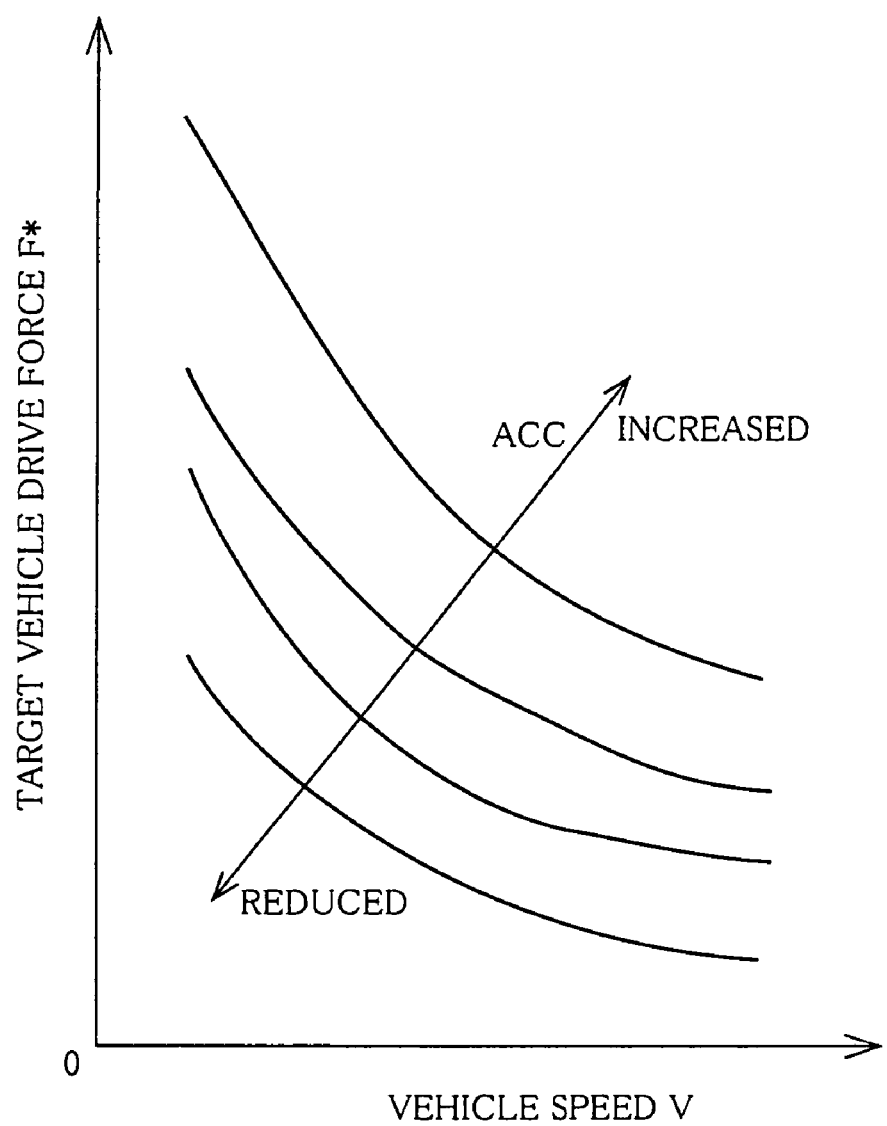
FIG. 4 is a graph indicating one example of a relationship (data map) among a vehicle speed, the target vehicle drive force and an operating angle of an accelerator pedal used as a parameter, which relationship was obtained by experimentation and stored in a memory and which is used to determine the target vehicle drive force on the basis of the accelerator pedal operating angle and the vehicle speed.

Referring to the functional block diagram of FIG. 3, there are illustrated major control functions of the electronic control device 80. A target-drive-force-related-value setting portion 100 shown in FIG. 3 is arranged to set the target vehicle drive force F*. Described in detail, the target-drive-force-related-value setting portion 100 determines the target vehicle drive force F* on the basis of the actual accelerator pedal operating amount $A_{CC}$ and vehicle speed V and according to a stored relationship (data map) among the vehicle speed V, the target vehicle drive force F* and the accelerator pedal operating amount $A_{CC}$ used as a parameter, as shown in FIG. 4. This relationship (data map) was obtained by experimentation.

When the vehicle stability control by the VDM_ECU 86 or the assisting control by the DSS_ECU 88 is effected, however, the target-drive-force-related-value setting portion 100 determines, as the operator's required vehicle drive force $F_{DIMD}$, the target vehicle drive force F* determined on the basis of the accelerator pedal operating amount $A_{CC}$ and vehicle speed V. The target-drive-force-related-value setting portion 100 selects one of the operator's required vehicle drive force $F_{DIMD}$, the required vehicle drive force $F_{DIMV}$ determined by the VDM_ECU 86 and the required vehicle drive force $F_{DIMS}$ determined by the DSS_ECU 88, according to the predetermined vehicle drive force selecting procedure, and determines the selected required vehicle drive force $F_{DIM}$ as the target vehicle drive force F*. For automatically controlling the state of the vehicle, the target-drive-force-related-value setting portion 100 normally selects one of the required vehicle drive force $F_{DIMV}$ and the required vehicle drive force $F_{DIMS}$, as the target vehicle drive force F*.

A target-throttle-valve-angle calculating portion 102 is arranged to calculate the target throttle valve opening angle $\theta_{TH}^*$ for obtaining the output of the engine 12 to realize the target vehicle drive force F* set by the target-drive-force-related-value setting portion 100, in the presently selected speed position of the automatic transmission 16. Described in detail, the target-throttle-valve-angle calculating portion 102 calculates the target engine torque $T_E^*$ in the present speed position of the automatic transmission 16, on the basis of the target vehicle drive force F*, and calculates the target throttle valve opening angle $\theta_{TH}^*$ for obtaining the calculated target engine torque $T_E^*$. The target throttle valve opening angle $\theta_{TH}^*$ in the present speed position of the automatic transmission 16 will be hereinafter referred to simply as the target throttle valve opening angle $\theta_{TH}^*$, unless otherwise specified.

Figure 5:
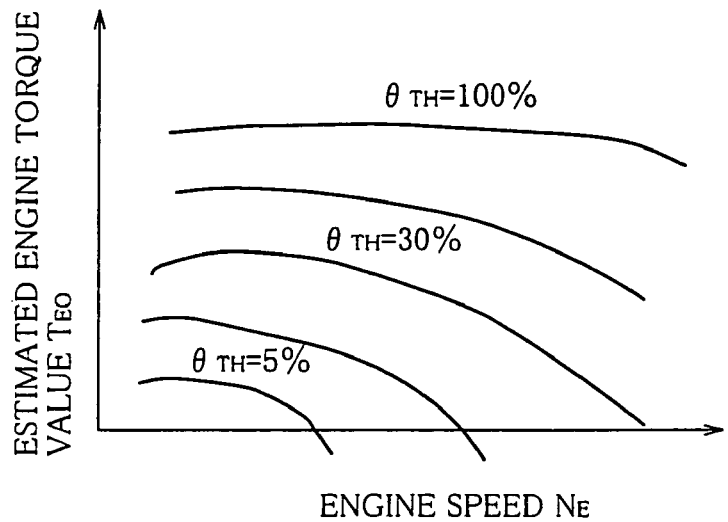
FIG. 5 is a graph indicating one example of a relationship (data map representative of a torque characteristic of the engine) among an engine speed, an estimated engine torque and an estimated engine torque value used as a parameter, which relationship was obtained by experimentation and stored in a memory and which is used to calculate the target throttle valve opening angle on the basis of the engine speed, such that the target throttle valve opening angle corresponds to the estimated engine torque for obtaining a target engine torque.

For example, the target-throttle-valve-angle calculating portion 102 is arranged to calculate the target engine torque $T_E^*$ according to an equation $T_E^* = (F^* \times r_w)/(\gamma \times i)$, on the basis of the target vehicle drive force F*, the speed ratio $\gamma$ of the presently or newly selected speed position of the automatic transmission 16, a speed reduction ratio of the drive wheels 74 with respect to the engine 12 (which ratio is calculated without taking account of the speed ratio $\gamma$), namely, a speed reduction ratio i of the differential gear device 70, etc., and an effective tire radius $r_w$ of the drive wheels 72. The target-throttle-valve-angle calculating portion 102 calculates the target throttle valve opening angle $\theta_{TH}^*$ for obtaining the calculated target engine torque $T_E^*$, on the basis of the actual engine speed $N_E$ in the present speed position of the automatic transmission 16 and according to a stored predetermined engine torque characteristic which is a relationship (data map) among the engine speed $N_E$, an estimated engine torque value $T_{EO}$ and the throttle vale opening angle $\theta_{TH}$ used as a parameter, as shown in FIG. 5, such that the target throttle valve opening angle $\theta_{TH}^*$ corresponds to the estimated engine torque value $T_{EO}$ for obtaining the target engine torque $T_E^*$. This relationship (data map) was obtained by experimentation.

An engine control portion 104 is arranged to apply a drive signal to the throttle actuator 28 for controlling the electronic throttle valve 30 to establish the target throttle valve opening angle $\theta_{TH}^*$ calculated by the target-throttle-valve-angle calculating portion 102.

Figure 6:
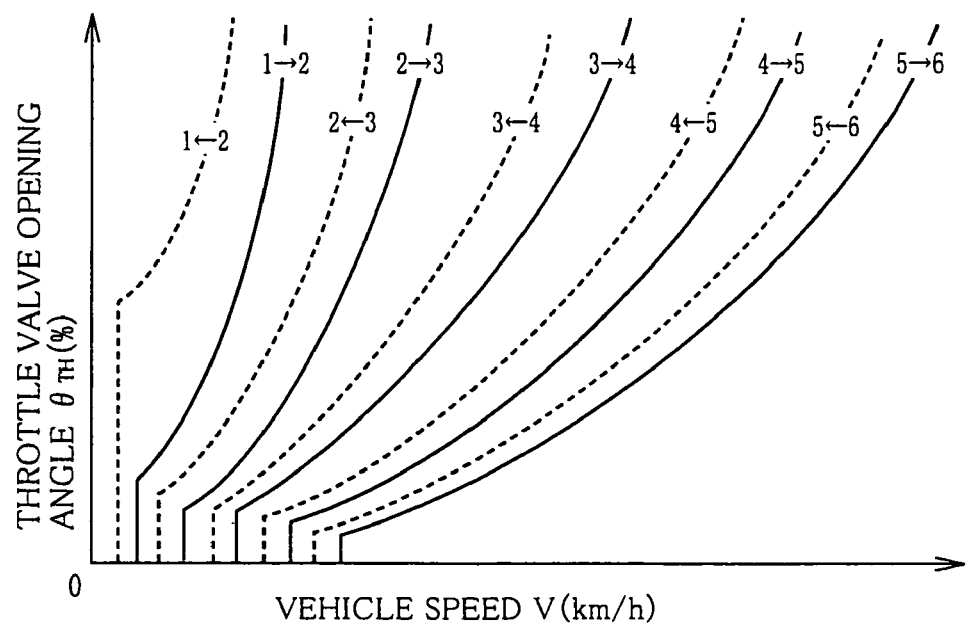
FIG. 6 is a graph indicating one example of a relationship (shift-boundary data map representative of shift-up and shift-down boundary lines) represented in a two-dimensional coordinate system defined by an axis of the vehicle speed and an axis of the throttle opening angle, which is stored in a memory and which is used by the electronic control device of FIG. 1 to control shifting actions of the automatic transmission.

A shift control portion 106 is arranged to determine a shifting action of the automatic transmission 16 on the basis of the actual vehicle speed V and the target throttle valve opening angle $\theta_{TH}^*$ calculated by the target-throttle-valve-angle calculating portion 102, and according to a stored predetermined shift-boundary data map (relationship) represented in a two-dimensional coordinate system defined by an axis of the vehicle speed V and an axis of the throttle valve opening angle $\theta_{TH}$, as shown in FIG. 6. The shift control portion 106 commands the automatic transmission 16 so as to effect the determined shifting action. Namely, the shift control portion 106 applies switching signals to the hydraulic control unit 22, to engage the appropriate hydraulically operated frictional coupling devices (clutches and brakes) for effecting the determined shifting action.

The shift-boundary data map shown in FIG. 6 represents shift-up boundary lines (indicated by solid lines) for determining whether the automatic transmission 16 should be shifted up, and shift-down boundary lines (indicated by broken lines) for determining whether the automatic transmission 16 should be shifted down. The shift-up boundary line and shift-down boundary line for respective shift-up and shift-down actions between the same two speed positions of the automatic transmission 16 are offset with respect to each other by a suitable amount of hysteresis. Further, the shift-up and shift-down boundary lines are formulated such that the automatic transmission 16 is shifted down to a speed position whose speed ratio $\gamma$ is higher than that of the present speed position, as the vehicle speed V is lowered or as the target throttle valve opening angle $\theta_{TH}^*$ is increased. In FIG. 6, "1" through "6" respectively indicate the first-speed position through sixth-speed position of the automatic transmission 16. For example, a determination as to whether a shift-up or shift-down action of the automatic transmission 16 should be effected at the actual vehicle speed V is made depending upon whether the target throttle valve opening angle $\theta_{TH}^*$ moves across any shift-up or shift-down boundary line, along a vertical straight line indicative of the actual vehicle speed V, that is, becomes larger or smaller than a determination threshold value (shift point of the opening angle) $\theta$s indicated by a point of intersection of the shift-up or shift-down boundary line and the vertical straight line. In this respect, each of the shift-up and shift-down boundary lines is considered to consists of a succession of determination threshold values $\theta$s (shift points of the opening angle) stored in a memory.

Figure 13:
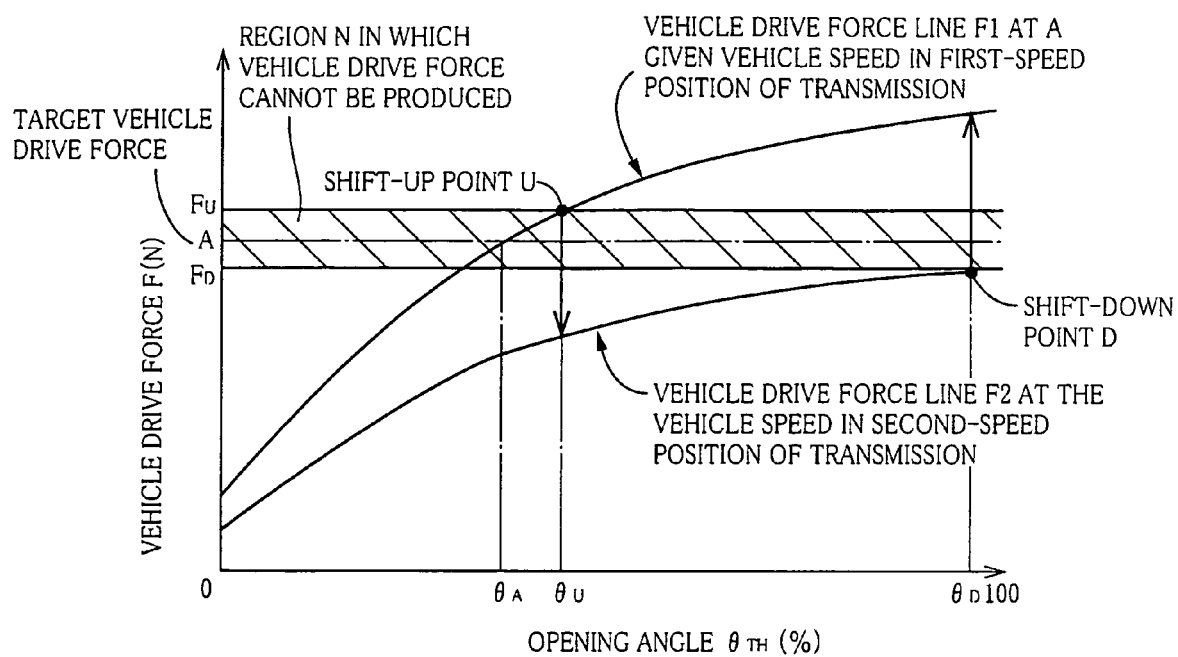
FIG. 13 is a view indicating examples of vehicle drive force lines at a given vehicle speed in first-speed and second-speed positions of the automatic transmission, which are represented in a two-dimensional coordinate system defined by an axis of the throttle valve opening angle and an axis of the vehicle drive force, the view explaining a possibility that a shift hunting phenomenon takes place during shifting of the automatic transmission depending upon a specific set value of the target vehicle drive force where the throttle valve opening angle is calculated on the basis of the target vehicle drive force.

As described above, the vehicle drive force is controlled so as to coincide with target vehicle drive force F* by controlling the engine torque $T_E$ by the engine control portion 104 and/or controlling the shifting action of the automatic transmission 16 by the shift control portion 106. According to the vehicle drive force lines at the same vehicle speed V1 as shown in FIG. 13, there exists a difference between a vehicle drive force Fu at a shift-up throttle valve opening angle $\theta_U$ at the shift-up point U and a vehicle drive force $F_D$ at a shift-down throttle valve opening angle $\theta_D$ at the shift-down point D, wherein $F_U > F_D$, so that there exists the region N in which the target vehicle drive force F* cannot be produced (realized). If the target drive force A is set within this region N, there arises a shift hunting phenomenon. That is, the vehicle drive force lines are determined by the specifications of the vehicle such as the engine torque characteristic and the speed ratios $\gamma$ of the individual speed positions of the automatic transmission 16. The vehicle drive forces $F_U$ and $F_D$ at the shift-up and shift-down points for respective shift-up and shift-down actions between the same two speed positions of the automatic transmission 16 may be different from each other ($F_U > F_D$), depending upon the specifications of the vehicle. In this case, there exists the region N in which the target vehicle drive force F* cannot be produced (realized), so that the shift hunting phenomenon may take place depending upon a specific value of the target vehicle drive force F*.

The present embodiment is arranged to perform control operations so as to prevent the shift hunting phenomenon which would otherwise take place due to the region N in which the target vehicle drive force F* cannot be realized when the automatic transmission 16 is shifted on the basis of the target throttle valve opening angle $\theta_{TH}^*$ and according to the shift-boundary data map of FIG. 6, for example, under the control of the shift control portion 106, depending upon the specifications of the vehicle such as the engine torque characteristic and speed ratios γ of the automatic transmission 16. These control operations will be described.

A shift determining portion 108 is arranged to determine whether to effect a shifting action of the automatic transmission 16 to a newly selected speed position on the basis of the vehicle speed V and the target throttle valve opening angle $\theta_{TH}^*$ calculated by the target-throttle-valve-angle calculating portion 102, and according to the shift-boundary data map of FIG. 6, for example.

A shift permitting portion 110 is operable to permit a subsequent shifting action of the automatic transmission 16 by the shift control portion 106 on the basis of the target throttle valve opening angle $\theta_{TH}^*$, namely, a shifting action of the automatic transmission 16 back to an original or previous speed position prior to a previous shifting action to the present speed position, under the control of the shift control portion 106 on the basis of the target throttle valve opening angle $\theta_{TH}^*$, if the previous shifting action to the present speed position has been determined by the shift determining portion 108. That is, the shift permitting portion 110 permits the subsequent or second shifting action of the automatic transmission 16 back to the original speed position after the previous or first shifting action to the present speed position, on the basis of the same target throttle valve opening angle $\theta_{TH}^*$ as used to determine the previous shifting action. Namely, the shift permitting portion 110 inhibits the subsequent shifting action of the automatic transmission 16 back to the original speed position immediately after the previous shifting action to the present speed position, on the basis of the target throttle valve opening angle $\theta_{TH}^*$ after the previous shifting action (in the present speed position). Accordingly, the shift permitting portion 110 prevents an occurrence of the shift hunting phenomenon of the automatic transmission 16.

In other words, the shift permitting portion 110 permits a subsequent one of a shift-up action and a shift-down action which are determined on the basis of the same target throttle valve opening angle $\theta_{TH}^*$ prior to the subsequent shifting action, back to the previous or original speed position after the other or previous shifting action, so as to maintain a predetermined hysteresis between the determinations of the shift-up and shift-down actions between the same two speed positions according to the shift-boundary data map of FIG. 6.

Although the shift hunting phenomenon is prevented by the shift permitting portion 110, there is a problem that the subsequent shifting action of the automatic transmission 16 back to the original speed position after the previous shifting action does not take place even in the event of a change of the target throttle valve opening angle $\theta_{TH}^*$, unless the subsequent shifting action back to the original speed position is permitted on the basis of the target throttle valve opening angle $\theta_{TH}^*$ by the shift permitting portion 110.

To solve this problem, a second target-throttle-valve-angle calculating portion 112 is provided to calculate a second target throttle valve opening angle $\theta_{TH2}^*$ for obtaining an output of the engine 12 to realize the target vehicle drive force F* set by the target-drive-force-related-value setting portion 100, in the original speed position prior to the shifting action of the automatic transmission 16 to the present speed position. Described in detail, the second target-drive-force-related-value calculating portion 112 is arranged to calculate a second target engine torque $T_{E2}^*$ in the original speed position, on the basis of the target vehicle drive force F*, and calculate the second target throttle valve opening angle $\theta_{TH2}^*$ for obtaining the calculated second target engine torque $T_{E2}^*$. The second target throttle valve opening angle $\theta_{TH}2^*$ in the original speed position will be referred to simply as "second target throttle valve opening angle $\theta_{TH2}^*$", unless otherwise specified.

For example, the second target-throttle-valve-angle calculating portion 112 is arranged to calculate the second target engine torque $T_{E2}^*$ according to an equation $T_{E2}^* = (F^* \times r_w)/(\gamma' \times i)$, on the basis of the target vehicle drive force F*, the speed ratio γ' of the original speed position of the automatic transmission 16 prior to the shifting action to the present speed position, the speed reduction ratio i of the differential gear device 70, etc., and the effective tire radius $r_w$ of the drive wheels 72. The second target-throttle-valve-angle calculating portion 112 calculates the second target throttle valve opening angle $\theta_{TH2}^*$ for obtaining the calculated second target engine torque $T_{E2}^*$, on the basis of the actual engine speed NE ($\gamma' \times N_{OUT}$, where the speed ratio of the torque converter 14 is equal to 1) in the original speed position of the automatic transmission 16 and according to the stored predetermined engine torque characteristic (relationship or data map) of FIG. 5 obtained by experimentation, such that the second target throttle valve opening angle $\theta_{TH2}^*$ corresponds to the estimated engine torque value $T_{EO}$ for obtaining the second target engine torque $T_E^*$. This relationship (data map) was obtained by experimentation.

The shift control portion 106 effects the subsequent shifting action of the automatic transmission 16 back to the original speed position, on the basis of the actual vehicle speed V and the second target throttle valve opening angle $\theta_{TH2}^*$ calculated by the second target-throttle-valve-angle calculating portion 112, and according to the stored predetermined shift-boundary data map of FIG. 6, for example, to prevent the automatic transmission 16 from remaining in the present speed position until the subsequent shifting action back to the original speed position is permitted on the basis of the target throttle valve opening angle $\theta_{TH}^*$ by the shift permitting portion 110.

Namely, the shift control portion 106 permits the subsequent shifting action of the automatic transmission 16 back to the original speed position after the previous shifting action to the present speed position, on the basis of the second target throttle valve opening angle $\theta_{TH}2^*$ and the actual vehicle speed V, to thereby prevent inhibition of the subsequent shifting action of the automatic transmission 16 back to the original speed position as long as this subsequent shifting action of the automatic transmission 16 on the basis of the target throttle valve opening angle $\theta_{TH}^*$ is inhibited by the shift permitting portion 110, in other words, to prevent an excessive degree of inhibition of the subsequent shifting action back to the original speed position to prevent the shift hunting phenomenon by the shift permitting portion 110.

Figure 7:
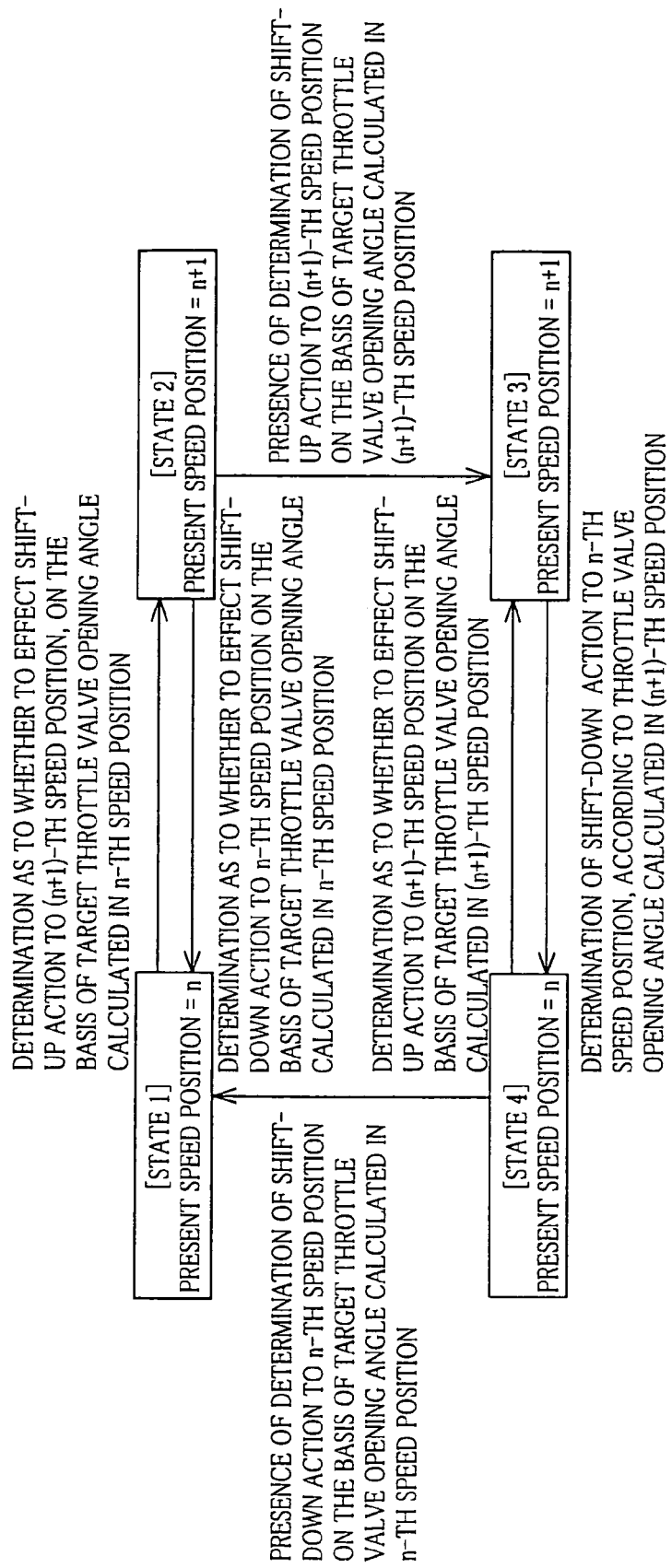
FIG. 7 is a view indicating shift-up and shift-down actions of the automatic transmission between an n-th speed position and an (n+1)-th speed position, which are controlled by the electronic control device of FIG. 1 in different states of transition of shifting of the automatic transmission.

Referring to FIG. 7, there are indicated shift-up and shift-down actions of the automatic transmission 16 between an n-th speed position and an (n+1)-th speed position under the control of the shift control portion 106 in different states of transition of shifting of the automatic transmission 16, together with operations of the shift permitting portion 110 to permit a subsequent shifting action of the automatic transmission 16 back to the original speed position on the basis of the target throttle valve opening angle $\theta_{TH}$* after a previous shifting action of the automatic transmission 16 from the original speed position to the present speed position as a result of determination of the previous shifting action by the shift determining portion 108.

There will be described in detail operations of the shift permitting portion 110, the shift determining portion 108 and the shift control portion 106, by reference to FIG. 7. The automatic transmission 16 is presently placed in the n-th speed position in state 1 and state 4 indicated in FIG. 7, and in the (n+1)-th speed position in state 2 and state 3 indicated in FIG. 7.

The state 1 is a state which is established as a result of transition from the state 4 and in which a shift-up action of the automatic transmission 16 from the present n-th speed position to the (n+1)-th speed position by the shift control portion 106 on the basis of the actual vehicle speed V and the target throttle valve opening angle $\theta_{TH}$* calculated in the present n-th speed position is permitted by the shift permitting portion 110, in the presence of a determination by the shift determining portion 108 of a shift-down action to the present n-th speed position on the basis of the actual vehicle speed V and the target throttle opening angle $\theta_{TH}$* calculated in the present n-th speed position and according to the shift-boundary data map of FIG. 6, after a shift-down action of the automatic transmission 16 by the shift control portion 106 from the (n+1)-th speed position to the present n-th speed position on the basis of the target throttle valve opening angle $\theta_{TH}$* calculated in the (n+1)-th speed position as a result of a determination of this shift-down action, that is, after transition from the state 3 to the state 4.

The state 4 is a state in which the shift-up action of the automatic transmission 16 to the (n+1)-th speed position by the shift control portion 106 on the basis of the actual vehicle speed V and the target throttle valve opening angle $\theta_{TH}$* calculated in the present n-th speed position is not permitted by the shift permitting portion 110, in the absence of the determination by the shift determining portion 108 of a shift-down action to the present n-th speed position on the basis of the actual vehicle speed V and the target throttle opening angle $\theta_{TH}$* calculated in the present n-th speed position and according to the shift-boundary data map of FIG. 6, after the shift-down action of the automatic transmission 16 by the shift control portion 106 from the (n+1)-th speed position to the present n-th speed position on the basis of the target throttle valve opening angle $\theta_{TH}$* calculated in the (n+1)-th speed position as a result of this shift-down action, that is, after transition from the state 3 to the state 4. Namely, the state 4 is prior to the state 1.

Thus, the shift determining portion 108 determines a shift-down action of the automatic transmission 16 to the present n-th speed position on the basis of the actual vehicle speed V and the target throttle valve opening angle $\theta_{TH}$* calculated in the n-th speed position after a previous shift-down action and according to the shift-boundary data map of FIG. 6. The shift permitting portion 110 permits a shift-up action of the automatic transmission 16 by the shift control portion 106 on the basis of the actual vehicle speed V and the target throttle valve opening angle $\theta_{TH}$* calculated in the present n-th speed position, only in the presence of the determination by the shift determining portion 108 of the shift-down action to the present n-th speed position.

In the state 1 described above, the shift control portion 106 determines as to whether to effect the shift-up action of the automatic transmission 16 from the present n-th speed position to the (n+1)-th speed position, that is, as to whether to effect a transition from the state 1 to the state 2, on the basis of the target throttle valve opening angle $\theta_{TH}$* calculated in the present n-th speed position. In other words, the shift control portion 106 uses, in the state 1, the target throttle valve opening angle $\theta_{TH}$* calculated in the present n-th speed position, for determining as to whether to effect the shift-up action of the automatic transmission 16.

In the state 4 described above, the shift control portion 106 determines as to whether to effect the shift-up action of the automatic transmission 16 from the present n-th speed position to the (n+1)-th speed position, that is, as to whether to effect a transition from the state 3 to the state 4, on the basis of the second target throttle valve opening angle $\theta_{TH2}$* calculated in the (n+1)-th speed position prior to the previous shift-down action. In other words, the shift control portion 106 uses, in the state 4, the second target throttle valve opening angle $\theta_{TH2}$* calculated in the (n+1)-th speed position prior to the previous shift-down action, for determining as to whether to effect the shift-up action of the automatic transmission 16.

As described above, the second target-throttle-valve-angle calculating portion 112 calculates the second target throttle valve opening angle $\theta_{TH}2$* in the (n+1)-th speed position from which the automatic transmission 16 has been shifted down. The shift control portion 106 uses the second target throttle valve opening angle $\theta_{TH2}$* calculated in the (n+1)-th speed position prior to the previous shift-down action and according to the shift-boundary data map of FIG. 6, for determining as to whether to effect a shift-up action of the automatic transmission 16, until the shift permitting portion 110 permits a shift-up action of the automatic transmission 16 on the basis of the target throttle valve opening angle $\theta_{TH}$* calculated in the present n-th speed position.

The determination by the shift determining portion 108 as to whether to effect a shift-down action of the automatic transmission 16 on the basis of the actual vehicle speed V and the target throttle valve opening angle $\theta_{TH}$* calculated in the present n-th speed position prior to the previous shift-down action is made, for example, depending upon whether the target throttle valve opening angle $\theta_{TH}$* calculated in the present n-th speed position has increased to move across the shift-down boundary line provided to determine as to whether to effect the shift-down action from the (n+1)-th speed position to the n-th speed position.

The shift permitting portion 110 determines that the predetermined amount of hysteresis for the determination of the shift-up action from the n-th speed position to the (n+1)-th speed position has been obtained, if the shift determining portion 108 has determined that the target throttle valve opening angle $\theta_{TH}$* calculated in the n-th speed position has increased to move across the shift-down boundary line for determination as to whether to effect the shift-down action from the (n+1)-th speed position to the n-th speed position. In this case, a SHIFT-UP DETERMINATION HYSTERESIS flag is turned on. The shift permitting portion 110 determines whether this SHIFT-UP DETERMINATION HYSTERESIS flag is in the on state. In the state 1, this SHIFT-UP DETERMINATION HYSTERESIS flag is placed in the on state. In the state 4, the flag is placed in the off state.

When the shift permitting portion 110 determines that the SHIFT-UP DETERMINATION HYSTERESIS is placed in the on state, the shift control portion 106 uses the target throttle valve opening angle $\theta_{TH}$* calculated in the present n-th speed position, as a shift-up determination target throttle valve opening angle for determining as to whether to effect a shift-up action. When the shift determining portion 108 determines that the target throttle valve opening angle $\theta_{TH}^*$ calculated in the present n-th speed position after a previous shift-down action has increased to move across the shift-down boundary line for determination as to whether to effect a shift-down action from the (n+1)-th speed position to the n-th speed position, while it is determined by the shift permitting portion 110 that the SHIFT-UP DETERMINATION HYSTERESIS flag is placed in the off state, this flag is turned into the on state, and the shift control portion 106 uses the target throttle valve opening angle $\theta_{TH}^*$ calculated in the present n-th speed position as the shift-up determination throttle valve opening angle.

The shift control portion 106 uses the second target throttle valve opening angle $\theta_{TH2}^*$ calculated in the (n+1)-th speed position prior to the previous shift-down action, as the shift-up determination throttle valve opening angle, if the shift determining portion 108 does not determine that the target throttle valve opening angle $\theta_{TH}^*$ calculated in the present n-th speed position has increased to move across the shift-down boundary line for determination as to whether to effect the shift-down action from the (n+1)-th position to the n-th position, while the shift permitting portion 110 determines that the SHIFT-UP DETERMINATION HYSTERESIS flag is placed in the off state, that is, if the flag is kept in the off state by the shift permitting portion 110.

Thus, the determination of the shift-up action from the state 1 to the state 2 immediately after the shift-down action from the state 3 to the state 4 is prevented before transition from the state 4 to the state 1, to thereby prevent the shift hunting phenomenon. Further, the shift-up action from the state 4 to the state 3 is permitted before transition from the state 4 to the state 1, so that the complete inhibition of the shift-up action is prevented.

When the shift control portion 106 determines the shift-up action on the basis of the shift-up determination target throttle opening angle, the shift permitting portion 110 turns off the SHIFT-UP DETERMINATION HYSTERESIS flag. Accordingly, the shift-down action while this flag is kept in the off state is prevented, so that the shift-up action immediately after the shift-down action is prevented to prevent the shift hunting phenomenon. Described in detail, the shift control portion 106 determines the shift-up action on the basis of the target throttle valve opening angle $\theta_{TH}^*$ calculated in the present n-th speed position, as the shift-up determination target throttle valve opening angle, and the shift permitting portion 110 turns off the SHIFT-UP DETERMINATION HYSTERESIS flag if the determined shift-up action is actually effected.

The state 3 is a state which is established as a result of transition from the state 2 and in which a shift-down action of the automatic transmission 16 from the (n+1)-th speed position to the n-th speed position by the shift control portion 106 on the basis of the actual vehicle speed V and the target throttle valve opening angle $\theta_{TH}^*$ calculated in the present (n+1)-th speed position is permitted by the shift permitting portion 110, in the presence of a determination by the shift determining portion 108 of a shift-up action to the present (n+1)-th speed position on the basis of the actual vehicle speed V and the target throttle opening angle $\theta_{TH}^*$ calculated in the present (n+1)-th speed position and according to the shift-boundary data map of FIG. 6, after a shift-up action of the automatic transmission 16 by the shift control portion 106 from the n-th speed position to the present (n+1)-th speed position on the basis of the target throttle valve opening angle $\theta_{TH}^*$ calculated in the n-th speed position as a result of a determination of this shift-down action, that is, after transition from the state 1 to the state 2.

The state 2 is a state in which the shift-down action of the automatic transmission 16 to the n-th speed position by the shift control portion 106 on the basis of the actual vehicle speed V and the target throttle valve opening angle $\theta_{TH}^*$ calculated in the present (n+1)-th speed position is not permitted by the shift permitting portion 110, in the absence of the determination by the shift determining portion 108 of a shift-up action to the present (n+1)-th speed position on the basis of the actual vehicle speed V and the target throttle opening angle $\theta_{TH}^*$ calculated in the present (n+1)-th speed position and according to the shift-boundary data map of FIG. 6, after the shift-up action of the automatic transmission 16 by the shift control portion 106 from the n-th speed position to the present (n+1)-th speed position on the basis of the target throttle valve opening angle $\theta_{TH}^*$ calculated in the n-th speed position as a result of this shift-up action, that is, after transition from the state 1 to the state 2. Namely, the state 2 is prior to the state 3.

Thus, the shift determining portion 108 determines a shift-up action of the automatic transmission 16 to the present (n+1)-th speed position on the basis of the actual vehicle speed V and the target throttle valve opening angle $\theta_{TH}^*$ calculated in the present (n+1)-th speed position after a previous shift-up action and according to the shift-boundary data map of FIG. 6. The shift permitting portion 110 permits a shift-sown action of the automatic transmission 16 by the shift control portion 106 on the basis of the actual vehicle speed V and the target throttle valve opening angle $\theta_{TH}^*$ calculated in the present (n+1)-th speed position, only in the presence of the determination by the shift determining portion 108 of the shift-up action to the present (n+1)-th speed position.

In the state 3 described above, the shift control portion 106 determines as to whether to effect the shift-down action of the automatic transmission 16 from the present (n+1)-th speed position to the n-th speed position, that is, as to whether to effect a transition from the state 3 to the state 4, on the basis of the target throttle valve opening angle $\theta_{TH}^*$ calculated in the present (n+1)-th speed position. In other words, the shift control portion 106 uses, in the state 3, the target throttle valve opening angle $\theta_{TH}^*$ calculated in the present (n+1)-th speed position, for determining as to whether to effect the shift-down action of the automatic transmission 16.

In the state 2 described above, the shift control portion 106 determines as to whether to effect the shift-down action of the automatic transmission 16 from the present (n+1)-th speed position to the n-th speed position, that is, as to whether to effect a transition from the state 2 to the state 1, on the basis of the second target throttle valve opening angle $\theta_{TH2}^*$ calculated in the n-th speed position prior to the previous shift-up action. In other words, the shift control portion 106 uses, in the state 2, the second target throttle valve opening angle $\theta_{TH2}^*$ calculated in the n-th speed position prior to the previous shift-up action, for determining as to whether to effect the shift-down action of the automatic transmission 16.

As described above, the second target-throttle-valve-angle calculating portion 112 calculates the second target throttle valve opening angle $\theta_{TH}2^*$ in the n-th speed position from which the automatic transmission 16 has been shifted up. The shift control portion 106 uses the second target throttle valve opening angle $\theta_{TH2}^*$ calculated in the n-th speed position prior to the previous shift-up action and according to the shift-boundary data map of FIG. 6, for determining as to whether to effect a shift-down action of the automatic transmission 16, until the shift permitting portion 110 permits a shift-down action of the automatic transmission 16 on the basis of the target throttle valve opening angle $\theta_{TH}{}^*$ calculated in the present (n+1)-th speed position.

The determination by the shift determining portion 108 as to whether to effect a shift-up action of the automatic transmission 16 on the basis of the actual vehicle speed V and the target throttle valve opening angle $\theta_{TH}{}^*$ calculated in the present (n+1)-th speed position after the previous shift-up action is made, for example, depending upon whether the target throttle valve opening angle $\theta_{TH}{}^*$ calculated in the present (n+1)-th speed position has decreased to move across the shift-up boundary line provided to determine as to whether to effect the shift-up action from the n-th speed position to the (n+1)-th speed position.

The shift permitting portion 110 determines that the predetermined amount of hysteresis for the determination of the shift-down action from the (n+1)-th speed position to the n-th speed position has been obtained, if the shift determining portion 108 has determined that the target throttle valve opening angle $\theta_{TH}{}^*$ calculated in the (n+1)-th speed position has decreased to move across the shift-up boundary line for determination as to whether to effect the shift-up action from the n-th speed position to the (n+1)-th speed position. In this case, a SHIFT-DOWN DETERMINATION HYSTERESIS flag is turned on. The shift permitting portion 110 determines whether this SHIFT-DOWN DETERMINATION HYSTERESIS flag is in the on state. In the state 3, this SHIFT-DOWN DETERMINATION HYSTERESIS flag is placed in the on state. In the state 2, the flag is placed in the off state.

When the shift permitting portion 110 determines that the SHIFT-DOWN DETERMINATION HYSTERESIS is placed in the on state, the shift control portion 106 uses the target throttle valve opening angle $\theta_{TH}{}^*$ calculated in the present (n+1)-th speed position, as a shift-down determination target throttle valve opening angle for determining as to whether to effect a shift-down action. When the shift determining portion 108 determines that the target throttle valve opening angle $\theta_{TH}{}^*$ calculated in the present (n+1)-th speed position after a previous shift-up action has decreased to move across the shift-up boundary line for determination as to whether to effect a shift-up action from the n-th speed position to the (n+1)-th speed position, while it is determined by the shift permitting portion 110 that the SHIFT-DOWN DETERMINATION HYSTERESIS flag is placed in the off state, this flag is turned into the on state, and the shift control portion 106 uses the target throttle valve opening angle $\theta_{TH}{}^*$ calculated in the present (n+1)-th speed position as the shift-down determination throttle valve opening angle.

The shift control portion 106 uses the second target throttle valve opening angle $\theta_{TH2}{}^*$ calculated in the n-th speed position prior to the previous shift-up action, as the shift-down determination throttle valve opening angle, if the shift determining portion 108 does not determine that the target throttle valve opening angle $\theta_{TH}{}^*$ calculated in the present (n+1)-th speed position has decreased to move across the shift-up boundary line for determination as to whether to effect the shift-up action from the n-th position to the (n+1)-th position, while the shift permitting portion 110 determines that the SHIFT-DOWN DETERMINATION HYSTERESIS flag is placed in the off state, that is, if the flag is kept in the off state by the shift permitting portion 110.

Thus, the determination of the shift-down action from the state 3 to the state 4 immediately after the shift-up action from the state 1 to the state 2 is prevented before transition from the state 2 to the state 3, to thereby prevent the shift hunting phenomenon. Further, the shift-down action from the state 2 to the state 1 is permitted before transition from the state 2 to the state 3, so that the complete inhibition of the shift-down action is prevented.

When the shift control portion 106 determines the shift-down action on the basis of the shift-down determination target throttle opening angle, the shift permitting portion 110 turns off the SHIFT-DOWN DETERMINATION HYSTERESIS flag. Accordingly, the shift-up action while this flag is kept in the off state is prevented, so that the shift-down action immediately after the shift-up action is prevented to prevent the shift hunting phenomenon. Described in detail, the shift control portion 106 determines the shift-down action on the basis of the target throttle valve opening angle $\theta_{TH}{}^*$ calculated in the present (n+1)-th speed position, as the shift-down determination target throttle valve opening angle, and the shift permitting portion 110 turns off the SHIFT-DOWN DETERMINATION HYSTERESIS flag if the determined shift-down action is actually effected.

In the present embodiment described above, the present speed position is the (n+1)-th position in the state 2 and the state 3. If the present position is the n-th position in the states 2 and 3, however, the shift control portion 106 uses the target throttle valve opening angle $\theta_{TH}{}^*$ calculated in the present n-th position, as the shift-down determination target throttle valve opening angle, when the SHIFT-DOWN DETERMINATION HYSTERESIS flag is placed in the on state. If this flag is placed in the off state, the shift control portion 106 uses the second target throttle valve opening angle $\theta_{TH2}{}^*$ calculated in the (n−1)-th speed position prior to the previous shift-up action, as the shift-down determination target throttle valve opening angle.

Thus, where the present speed position is the n-th speed position, a shifting action of the automatic transmission 16 is determined depending upon a presently established one of the states 1-4, on the basis of three kids of target throttle valve opening angle, that is, the target throttle valve opening angle $\theta_{TH}{}^*$ calculated in the present n-th speed position, the second target throttle valve opening angle $\theta_{TH2}{}^*$ calculated in the (n+1)-th speed position prior to the previous shift-down action, and the second target throttle valve opening angle $\theta_{TH2}{}^*$ calculated in the (n−1)-th speed position prior to the previous shift-up action.

Referring to FIGS. 8-11, there are illustrated different examples of a shifting action of the automatic transmission according to the principle of FIG. 7. In these figures, shift-boundary lines indicated by solid lines are shift-up boundary lines for determination of a shift-up action from the n-th speed position to the (n+1)-th speed position, while shift-boundary lines indicated by broken lines are shift-down boundary lines for determination of a shift-down action from the (n+1)-th speed position to the n-th speed position. Further, throttle valve opening angles indicated by solid lines are the target throttle valve opening angles $\theta_{TH}{}^*$ calculated in the n-th speed position, and throttle valve opening angles indicated by broken lines are the target throttle valve opening angles $\theta_{TH}{}^*$ calculated in the (n+1)-th speed position, while throttle valve opening angles indicated by one-dot chain lines are target throttle valve opening angles $\theta_{TH}{}^*$ not used in the present invention.

Figure 8:
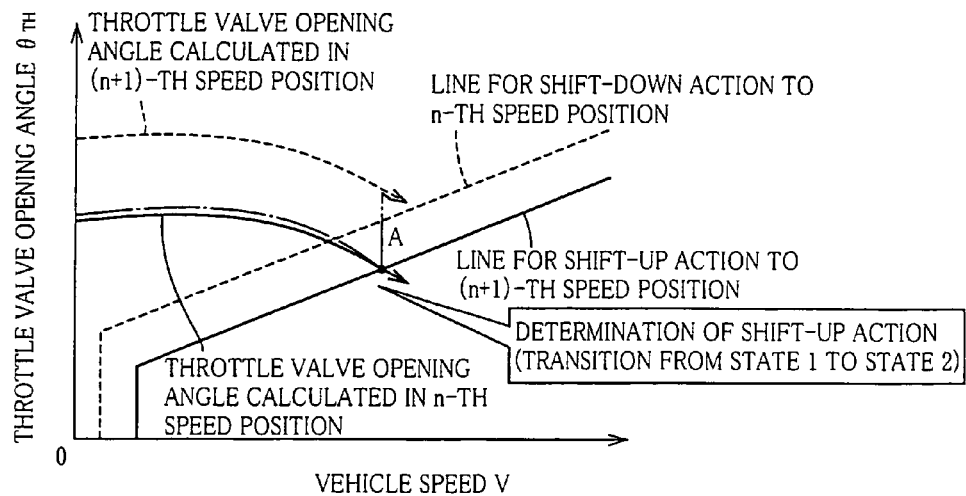
FIGS. 8-11 are views illustrating different examples of transition of shifting of the automatic transmission from the present speed position, according to the principle indicated in FIG. 7.

In the example of FIG. 8, a determination of the shift-up action to the (n+1)-th speed position is made at point A in the present state 1, on the basis of the target throttle valve opening angle $\theta_{TH}{}^*$ (indicated by the solid line) calculated in the present n-th speed position, and the determined shift-up action is effected for transition from the state 1 to the state 2. If the target throttle valve opening angle $\theta_{TH}{}^*$ indicated by the on-dot chain line was used, that is, if the target throttle valve opening angle $\theta_{TH}^*$ (indicated by the broken line) calculated in the (n+1)-th speed position after the determination of the shift-up action at point A was used, a determination of a shift-down action would be made immediately after the shift-up action, resulting in the shift hunting phenomenon. To prevent this drawback, the determination as to whether to effect the shift-down action is made in the state 2, on the basis of the second target throttle valve opening angle $\theta_{TH2}^*$ calculated in the n-th speed position prior to the previous shift-up action.

Figure 9:
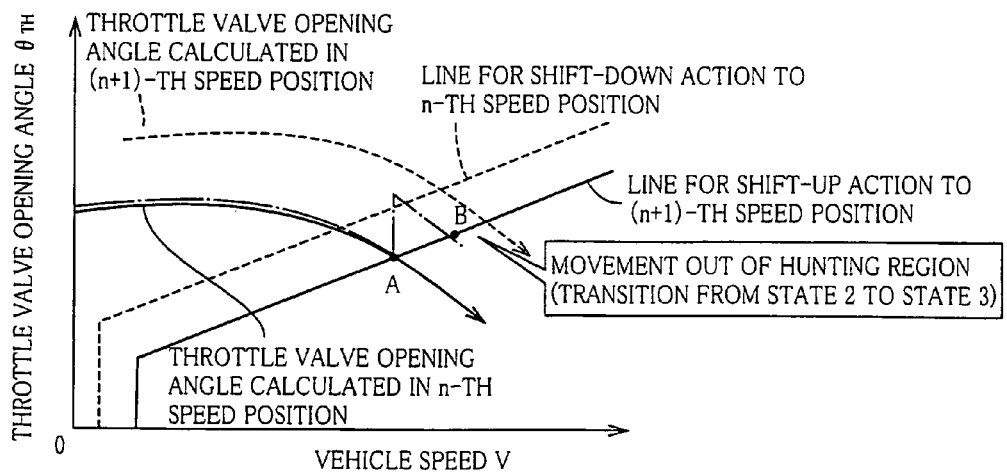

In the example of FIG. 9, a determination of the shift-up action to the (n+1)-th speed position is made at point B in the present state 2, on the basis of the target throttle valve opening angle $\theta_{TH}^*$ (indicated by the broken line) calculated in the (n+1)-th speed position after the shift-up action, and the determined shift-up action is effected for transition from the state 2 to the state 3, since the calculated target throttle valve opening angle $\theta_{TH}^*$ has moved out of a hunting region. In this state 3, the target throttle valve opening angle $\theta_{TH}^*$ (indicated by the broken line) calculated in the (n+1)-th speed position has moved across the shift-up boundary line for determination as to whether to effect the shift-up action from the n-th speed position to the (n+1)-th speed position, so that a determination as to whether to effect the shift-down action is made on the basis of the target throttle valve opening angle $\theta_{TH}^*$ (indicated by the broken line) calculated in the (n+1)-th speed position, so as to assure the predetermined hysteresis between the determinations of the shift-up and shift-down actions.

Figure 10:
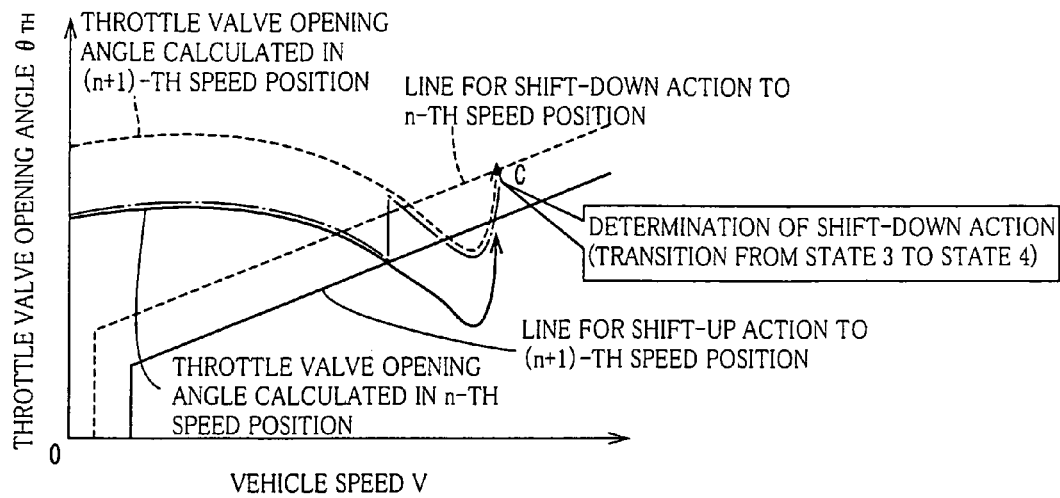

In the example of FIG. 10, a determination of the shift-down action to the n-th speed position is made at point C in the present state 3, on the basis of the target throttle valve opening angle $\theta_{TH}^*$ (indicated by the broken line) calculated in the present (n+1)-th speed position, and the determined shift-down action is effected for transition from the state 3 to the state 4. If the target throttle valve opening angle $\theta_{TH}^*$ (indicated by the solid line) calculated in the n-th speed position after the determination of the shift-down action at point C was used, a determination of a shift-up action to the (n+1)-th speed position would be made immediately after the shift-down action, resulting in the shift hunting phenomenon. To prevent this drawback, the determination as to whether to effect the shift-up action is made in the state 4, on the basis of the second target throttle valve opening angle $\theta_{TH2}^*$ calculated in the (n+1)-th speed position prior to the previous shift-down action. In the state 3, therefore, the throttle valve opening angle $\theta_{TH}^*$ (indicated by the broken line) once calculated in the (n+1)-th speed position has already increased to move across the shift-up boundary line for determination as to whether to effect the shift-up action from the n-th speed position to the (n+1)-th speed position, so that a sufficient amount of hysteresis between the determinations of the shift-up and shift-down actions is provided to prevent the determination of the shift-down action unless the target throttle valve opening angle has changed by a sufficiently large amount.

Figure 11:
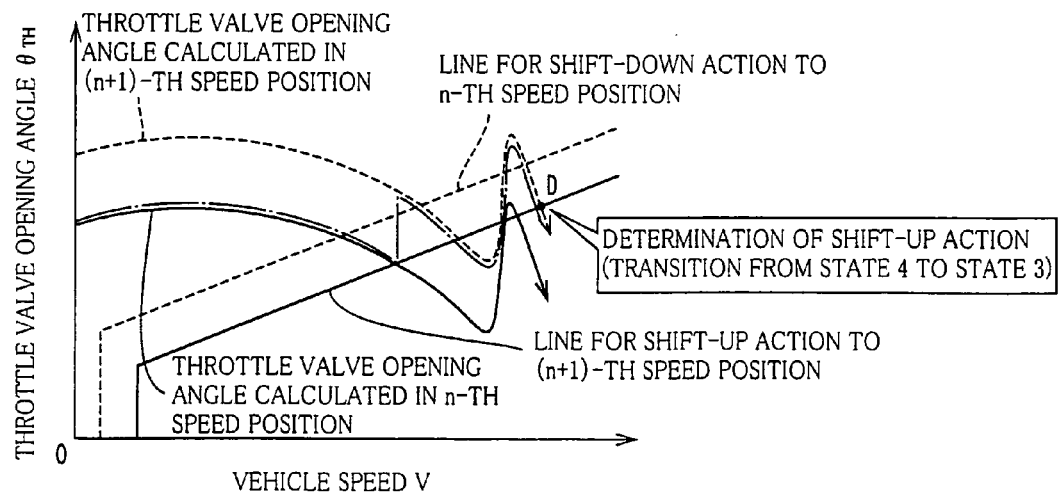

In the example of FIG. 11, a determination of the shift-up action to the (n+1)-th speed position is made at point D in the present state 4, on the basis of the target throttle valve opening angle $\theta_{TH}^*$ (indicated by the broken line) calculated in the (n+1)-th speed position before the shift-down action, and the determined shift-up action is effected for transition from the state 4 to the state 3. That is, in the absence of the determination of the shift-down action to the n-th speed position on the basis of the throttle valve opening angle $\theta_{TH}^*$ (indicated by the solid line) calculated in the present n-th speed position after the shift-down action in the state 4, that is, since this calculated throttle valve opening angle $\theta_{TH}^*$ has not moved out of the hunting region, and the state 1 has not been established, the determination as to whether to effect the shift-up action to the (n+1)-th speed position is made on the basis of the target throttle valve opening angle $\theta_{TH}^*$ (indicated by the broken line) calculated in the (n+1)-th speed position, like the determination as to whether to effect the shift-down action from the state 3 to the state 4. Accordingly, a sufficiently large amount of hysteresis is provided between the determinations of the shift-up and shift-down actions.

It will be understood from FIGS. 8-11 that a shifting action of the automatic transmission 16 back to the original gear position (speed position) prior to the previous shifting action is inhibited unless the shifting action back to the original speed position is determined on the basis of the target throttle valve opening angle calculated in the original gear position (speed position) and according to the shift-up and shift-down boundary lines, so that the determinations of the shifting actions are made so as to maintain the predetermined amount of hysteresis between the shift-up boundary line for the shift-up action between the two speed positions and the shift-down boundary line for the shift-down action between the same two speed positions, whereby the shift hunting phenomenon is prevented.

Figure 12:
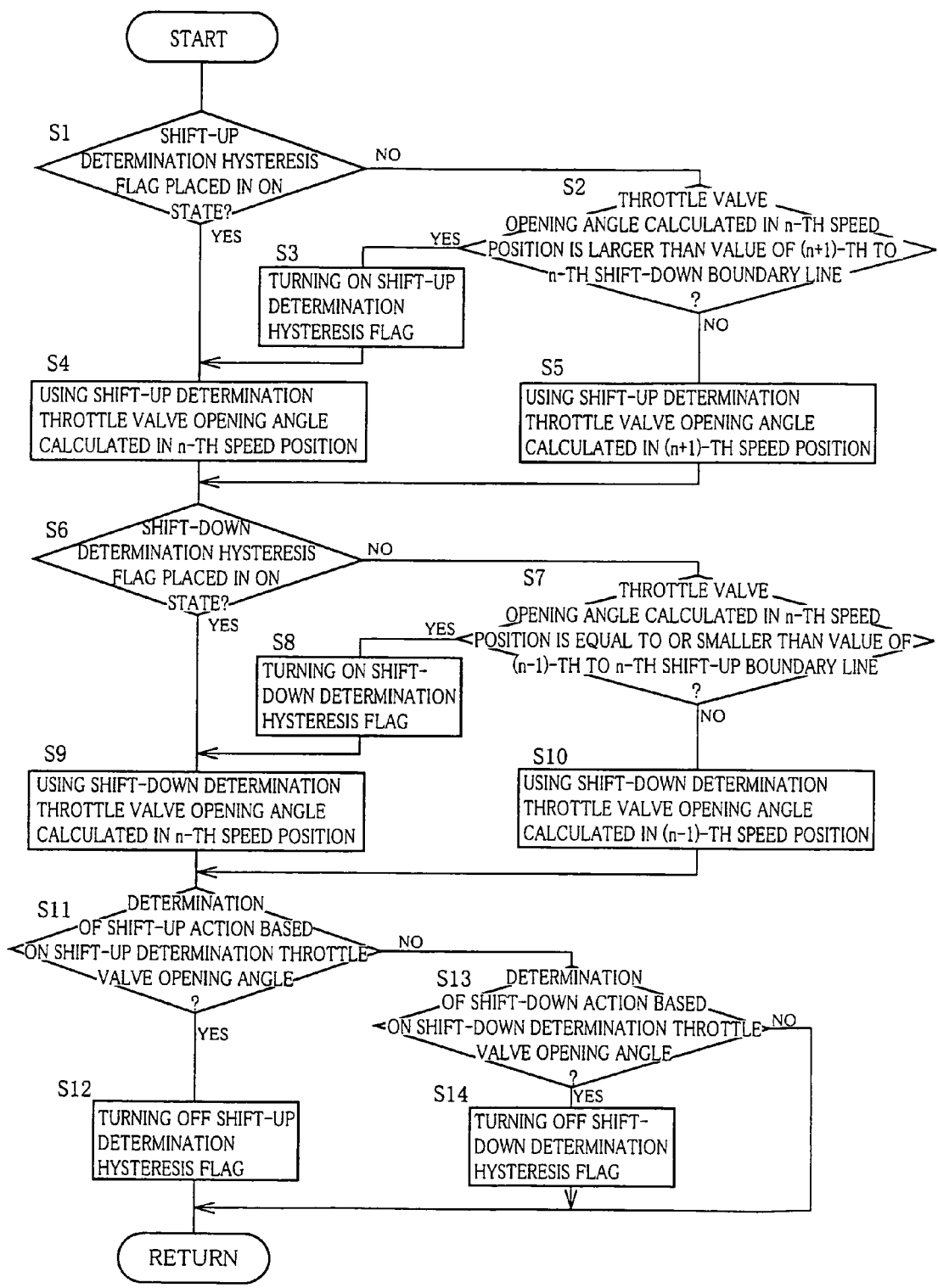
FIG. 12 is a flow chart illustrating major control operations performed by the electronic control device of FIG. 1, so as to prevent a shift hunting phenomenon which would take place during shifting of the automatic transmission on the basis of the target throttle valve opening angle.

Referring to the flow chart of FIG. 12, there are illustrated major control operations performed by the electronic control device 80, so as to prevent the shift hunting phenomenon which would take place during shifting of the automatic transmission 16 on the basis of the target throttle valve opening angle $\theta_{TH}^*$. This control routine is executed with an extremely short cycle time of about several to several tens of milliseconds, for example.

Initially, step S1 corresponding to the shift permitting portion 110 is implemented to determine whether the SHIFT-UP DETERMINATION HYSTERESIS flag is placed in the on state. If a negative decision is obtained in step S1, the control flow goes to step S2 corresponding to the shift determining portion 108, to determine whether the target throttle valve opening angle $\theta_{TH}^*$ calculated in the present n-th speed position has increased to move across the shift-down boundary line for determination of the shift-down action from the (n+1)-th speed position to the n-th speed position. If an affirmative decision is obtained in step S2, the control flow goes to step S3 corresponding to the shift permitting portion 110, to turn on the SHIFT-UP DETERMINATION HYSTERESIS flag.

If an affirmative decision is obtained in step S1 or after implementation of step S3, the control flow goes to step S4 corresponding to the shift control portion 106, to use the target throttle valve opening angle OTH* calculated in the n-th speed position, as the shift-up determination target throttle valve opening angle. If a negative decision is obtained in step S2, the control flow goes to step S5 corresponding to the shift control portion 106, to use the second target throttle valve opening angle $\theta_{TH2}^*$ calculated in the (n+1)-th speed position, as the shift-up determination target throttle valve opening angle.

Steps S4 and S5 are followed by step S6 corresponding to the shift permitting portion 110, to determine whether the SHIFT-DOWN DETERMINATION HYSTERESIS flag is placed in the on state. If a negative decision is obtained in step S6, the control flow goes to step S7 corresponding to the shift determining portion 108, to determine whether the target throttle valve opening angle $\theta_{TH}^*$ calculated in the present n-th speed position has decreased to move across the shift-up boundary line for determination of the shift-up action from the (n−1)-th speed position to the n-th speed position. If an affirmative decision is obtained in step S7, the control flow goes to step S8 corresponding to the shift permitting portion 110, to turn on the SHIFT-DOWN DETERMINATION HYSTERESIS flag.

If an affirmative decision is obtained in step S6 or after implementation of step S8, step S9 corresponding to the shift control portion 106, to use the target throttle valve opening angle $\theta_{TH}^*$ calculated in the present n-th speed position, as the shift-down determination target throttle valve opening angle. If a negative decision is obtained in step S7, the control flow goes to step S10 corresponding to the shift control portion 106, to use the second target throttle valve opening angle $\theta_{TH2}^*$ calculated in the (n−1)-th speed position, as the shift-down determination target throttle valve opening angle.

Steps S9 and S10 are followed by step S11 corresponding to the shift control portion 106, to determine whether a shift-up action has been actually determined on the basis of the shift-up determination target throttle valve opening angle. If an affirmative decision is obtained in step S11, the control flow goes to step S12 corresponding to the shift permitting portion 110, to turn off the SHIFT-UP DETERMINATION HYSTERESIS flag, and one cycle of execution of the present routine is terminated.

If a negative decision is obtained in step S11, the control flow goes to step S13 corresponding to the shift control portion 106, to determine whether a shift-down action has been actually determined on the basis of the shift-down determination target throttle valve opening angle. If a negative decision is obtained in step S13, one cycle of execution of the present routine is terminated. If an affirmative decision is obtained in step S13, the control flow goes to step S14 corresponding to the shift permitting portion 110, to turn off the SHIFT-DOWN DETERMINATION HYSTERESIS flag, and one cycle of execution of the present routine is terminated.

According to the present embodiment described above, the shift permitting portion 110 is arranged to permit a shifting action of the automatic transmission 16 back to an original speed position prior to a previous shifting action to the present n-th speed position, under the control of the shift control portion 106 on the basis of the target throttle valve opening angle $\theta_{TH}^*$ and the vehicle speed V, if the previous shifting action to the present n-th speed position has been determined by the shift determining portion on the basis of the vehicle speed V and the target throttle valve opening angle $\theta_{TH}^*$ which is calculated by the target-throttle-valve-angle calculating portion 102, so as to obtain the engine torque $T_E$ in the present n-th speed position for realizing the target vehicle drive force F* set by the target-drive-force-related-value setting portion 100. This arrangement prevents the shifting action of the automatic transmission 16 under the control of the shift control portion 106 on the basis of the target throttle valve opening angle, back to the original speed position prior to the previous shifting action to the present n-th speed position, immediately after the previous shifting action, thereby preventing the shift hunting phenomenon of the automatic transmission. In other words, the shift permitting portion 110 inhibits the shifting action back to the original speed position prior to the previous shifting action on the basis of the throttle valve opening angle $\theta_{TH}^*$ unless the shift-up action between the two speed positions and the shift-down action between the same two speed positions are determined on the basis of the same target throttle valve opening angle $\theta_{TH}^*$, so that the shifting actions of the automatic transmission 16 are controlled so as to maintain the predetermined amount of hysteresis between the determination of the shift-up action between the two speed positions and the determination of the shift-down action between those two speed positions. Therefore, the present embodiment prevents the shift hunting phenomenon which would otherwise take place where there exists a region in which the target vehicle drive force F* cannot be realized.

The present embodiment is further arranged such that the shift control portion 106 effects the shifting action of the automatic transmission 16 back to the original speed position prior to the previous shifting action, on the basis of the second target throttle opening angle $\theta_{TH2}^*$ and the vehicle speed V and according to the shift-boundary data map of FIG. 6, until the shifting action back to the original speed position on the basis of the target throttle valve opening angle $\theta_{TH}^*$ and the vehicle speed V has been permitted by the shift permitting portion 110. Accordingly, the shift control portion prevents complete inhibition of the shifting action back to the original speed position prior to the previous shifting action while the shifting action back to the original speed position on the basis of the throttle valve opening angle $\theta_{TH}^*$ is not permitted by the shift permitting portion 110. In other words, the shift control portion 106 prevents an excessive degree of inhibition of the shifting action back to the original speed position due to the prevention of the shift hunting phenomenon by the shift permitting portion 110.

The present embodiment is further arranged such that the target-drive-force-related-value setting portion 100 sets the target vehicle drive force F* on the basis of the accelerator pedal operating amount $A_{CC}$, so that the vehicle drive force as required by the vehicle operator can be adequately obtained.

The present embodiment is further arranged such that the target-drive-force-related-value setting portion 100 sets the target vehicle drive force F* for automatic control of the vehicle state, irrespective of the accelerator pedal operating amount $A_{CC}$, so that the vehicle can be driven by the target drive force F* adequately set irrespective of the accelerator pedal operating amount ACC, during the automatic control of the vehicle state.

While the preferred embodiment of this invention has been described in detail by reference to the drawings, it is to be understood that the present invention may be otherwise embodied.

In the illustrated embodiment described above, the target throttle valve opening angle $\theta_{TH}^*$ in the present n-th speed position of the automatic transmission 16 is calculated by the target-throttle-valve-angle calculating portion 102, while the second target throttle valve opening angles $\theta_{TH2}^*$ in the (n+1)-th and (n−1)-th speed positions are calculated by the second target-throttle-valve-angle calculating portion 112. However, the second target-throttle-valve-angle calculating portion 112 may not be provided. In this case, the target-throttle-valve-angle calculating portion 102 may be arranged to calculate the target throttle valve opening angles $\theta_{TH}^*$ in the n-th, (n+1)-th and (n−1)-th speed positions.

In the illustrated embodiment, the automatic transmission is controlled according to the principle of the present invention, even during an operation of the VSC system provided to stabilize the attitude of the vehicle. However, the automatic transmission may be controlled according to the present invention, during an operation of any system other than the VSC system, which is provided to stabilize the vehicle attitude, for instance, a TRC (traction control) system which is arranged to control the vehicle drive force F depending upon the state of a road surface by controlling the vehicle drive force F per se and/or the vehicle braking force, so as to reduce amounts of slipping of the drive wheels 74, for assuring high degrees of starting and accelerating performance, straight running stability and turning stability of the vehicle, upon an excessive amount of opening of the throttle valve during starting or acceleration of the vehicle on a slippery road surface, for example.

Although the accelerator pedal 44 is provided as the output control member in the illustrated embodiment, any other type of output control member may be used, provided that an operation of the output control member reflects an operator's required value relating to the vehicle drive force. For instance, the output control member may be a manually operable lever switch or a rotary switch. Further, the output control member may be operated according to a voice generated by the vehicle operator, so as to reflect the operator's required value relating to the vehicle drive force.

In the illustrated embodiment, the engine control portion 104 is arranged to control the throttle actuator 28 for controlling the electronic throttle valve 30 so as to establish the target throttle valve opening angle $\theta_{TH}^*$. However, the engine control portion 104 may be arranged to control the amount of fuel injection by the fuel injecting valve 52, or the timing of ignition by an igniting device such as the igniter 54, for obtaining the target engine torque $T_E^*$. In this case, the throttle valve opening angle $\theta_{TH}$ in FIG. 5 may be replaced by the air/fuel ratio or the fuel injection amount.

It is to be understood that the present invention may be made with various other changes and modifications, which may occur to those skilled in the art, without departing from the spirit and scope of the invention defined in the following claims.

What is claimed is:

1. A control apparatus for a step-variable automatic transmission of a vehicle having an engine operatively connected to the step-variable automatic transmission, said control apparatus comprising:
    a target-drive-force-related-value setting portion operable to set a target-drive-force-related value corresponding to a target drive force of the vehicle;
    a target-throttle-valve-angle calculating portion operable to calculate a target opening angle of a throttle valve of the engine for obtaining an output of the engine to realize the target-drive-force-related value in a present speed position of said step-variable automatic transmission;
    a shift control portion operable to determine a shifting action of the step-variable automatic transmission on the basis of said target opening angle of the throttle valve, a vehicle-speed-related value, and stored shift boundary lines which are predetermined so as to provide a predetermined amount of hysteresis between a determination of a shift-up action between two speed positions of the automatic transmission and a determination of a shift-down action between said two speed positions, and to effect said shifting action;
    a shift determining portion operable to determine as to whether to effect the shifting action of the step-variable automatic transmission to the present speed position, on the basis of the target opening angle of the throttle valve in the present speed position, the vehicle-speed-related value, and said shift boundary lines; and
    a shift permitting portion operable to permit the shifting action of said step-variable automatic transmission back to a previous speed position prior to a previous shifting action to the present speed position, via said shift control portion on the basis of the target opening angle of the throttle valve in said present speed position and said vehicle-speed-related value, if said previous shifting action to the present speed position was determined by said shift determining portion on the basis of the target opening angle of the throttle valve in the present speed position, the vehicle-speed-related value, and said shift boundary lines.

2. The control apparatus according to claim 1,
    wherein said shift determining portion determines whether said shift-down action to the present speed position should be effected, on the basis of the target opening angle of the throttle valve in the present speed position, the vehicle-speed-related value, and said shift boundary lines, and
    wherein said shift permitting portion permits the shift-up action of the step-variable automatic transmission back to the previous speed position prior to the previous shift-down action under the control of said shift control portion on the basis of said target opening angle in the present speed position and the vehicle-speed-related value, if the previous shift-down action to the present speed position has been determined by said shift determining portion.

3. The control apparatus according to claim 1,
    wherein said shift determining portion determines whether said shift-up action to the present speed position should be effected, on the basis of the target opening angle of the throttle valve in the present speed position, the vehicle-speed-related value, and said shift boundary lines, and
    wherein said shift permitting portion permits the shift-down action of the step-variable automatic transmission back to the previous speed position prior to the previous shift-up action under the control of said shift control portion on the basis of said target opening angle in the present speed position and the vehicle-speed-related value, if the previous shift-up action to the present speed position has been determined by said shift determining portion.

4. The control apparatus according to any one of claims 1-3, further comprising a second target-throttle-valve-angle calculating portion operable to calculate a second target opening angle of said throttle valve for obtaining an output of the engine to realize the target-drive-force-related value in said previous speed position prior to said previous shifting action of the step-variable automatic transmission, and
    wherein said shift control portion controls the shifting action of the step-variable automatic transmission back to said previous speed position prior to said previous shifting action, on the basis of said second target opening angle in said previous speed position, said vehicle-speed-related value, and said shift boundary lines, until said shift permitting portion permits the shifting action of the step-variable automatic transmission back to said previous speed position on the basis of said target opening angle in said present speed position and said vehicle-speed-related value.

5. The control apparatus according to claim 4,
    wherein said second target-throttle-valve-angle calculating portion calculates said second target opening angle of the throttle valve in said previous speed position prior to said shift-down action of the step-variable automatic transmission, and
    wherein said shift control portion controls said shift-up action of the step-variable automatic transmission back to said previous speed position prior to said shift-down action on the basis of said second target opening angle in said previous speed position prior to said shift-down action, said vehicle-speed-related value, and said shift boundary lines, until said shift permitting portion permits said shift-up action of the step-variable automatic transmission on the basis of said target opening angle in said present speed position and said vehicle-speed-related value.

6. The control apparatus according to claim 4,
wherein said second target-throttle-valve-angle calculating portion calculates said second target opening angle of the throttle valve in said previous speed position prior to said shift-up action of the step-variable automatic transmission, and
wherein said shift control portion controls said shift-down action of the step-variable automatic transmission back to said previous speed prior to said shift-up action on the basis of said second target opening angle in said previous speed position prior to said shift-up action, said vehicle-speed-related value, and said shift-boundary lines, until said shift permitting portion permits said shift-down action of the step-variable automatic transmission on the basis of said target opening angle in said present speed position and said vehicle-speed-related value.

7. The control apparatus according to claim 1, wherein said target-drive-force-related-value setting portion sets said target-drive-force-related value on the basis of an operating amount of an output control member manually operated by an operator of the vehicle.

8. The control apparatus according to claim 7, wherein said target-drive-force-related-value setting portion sets said target-drive-force-related value, irrespective of the operating amount of said output control member, for automatically controlling a state of the vehicle.

9. A control apparatus for a step-variable automatic transmission of a vehicle having an engine operatively connected to the step-variable automatic transmission, said control apparatus comprising:
a target-drive-force-related-value setting portion operable to set a target-drive-force-related value corresponding to a target drive force of the vehicle; a target-throttle-valve-angle calculating portion operable to calculate a target opening angle of a throttle valve of the engine for obtaining an output of the engine to realize the target-drive-force-related value in a present speed position of said step-variable automatic transmission;
a shift control portion operable to determine a shifting action of the step-variable automatic transmission on the basis of said target opening angle of the throttle valve and a vehicle-speed-related value and according to stored shift boundary lines which are predetermined so as to provide a predetermined amount of hysteresis between a determination of a shift-up action between two speed positions of the automatic transmission and a determination of a shift-down action between said two speed positions, and to effect said shifting action;
a shift determining portion operable to determine as to whether to effect a shifting action of the step-variable automatic transmission to the present speed position, on the basis of the target opening angle of the throttle valve in the present speed position and the vehicle-speed-related value, and according to said shift boundary lines; and
a shift permitting portion operable to permit a shifting action of said step-variable automatic transmission back to an original speed position prior to a previous shifting action to the present speed position, under the control of said shift control portion on the basis of the target opening angle of the throttle valve in said present speed position and said vehicle-speed-related value, if said previous shifting action to the present speed position has been determined by said shift determining portion, and
wherein said target-throttle-valve-angle calculating portion calculates a target torque $T_E^*$ of the engine in said present speed position according to the following equation (1), and calculates said target opening angle $\theta_{TH}^*$ for obtaining said target torque $T_E^*$, on the basis of a speed of the engine and according to a stored predetermined engine torque characteristic which is a relationship among the speed and torque of the engine, and the opening angle of the throttle valve used as a parameter, $$T_E^* = (F^* \times r_w)/(\gamma \times i) \tag{1}$$

wherein
$F^*$=said target drive force of the vehicle,
$\gamma$=a speed ratio of said present speed position of the step-variable automatic transmission,
$i$=a speed reduction ratio of drive wheels of the vehicle with respect to the engine, which ratio is calculated without taking account of said speed ratio $\gamma$,
$r_w$=an effective radius of said drive wheels,
$T_E^*$=said target torque for realizing said target drive force $F^*$, and
$\theta_{TH}^*$=said target opening angle in said present speed position.

10. The control apparatus according to claim 1, wherein said shift permitting portion permits the shifting action of said step-variable automatic transmission to said previous speed position prior to said previous shifting action, under the control of said shift control portion on the basis the target opening angle of the throttle valve in said present speed position and said vehicle-speed-related value, if said previous shifting action to the present speed position on the basis of said target opening angle of the throttle valve in the present speed position and the vehicle-speed-related value and according to said shift boundary lines has been determined by said shift determining portion, where there exists a region in which said target-drive-force-related value cannot be realized when the step-variable automatic transmission is shifted under the control of said shift control portion on the basis of the target opening angle in said present speed position and said vehicle-speed-related value and according to said shift boundary lines.

* * * * *